(12) United States Patent
Tokuchi

(10) Patent No.: US 11,042,963 B2
(45) Date of Patent: Jun. 22, 2021

(54) INFORMATION PROCESSING DEVICE, INFORMATION PROCESSING SYSTEM, AND NON-TRANSITORY COMPUTER READABLE MEDIUM

(71) Applicant: FUJI XEROX CO., LTD., Tokyo (JP)

(72) Inventor: Kengo Tokuchi, Kanagawa (JP)

(73) Assignee: FUJIFILM BUSINESS INNOVATION CORP., Tokyo (JP)

( * ) Notice: Subject to any disclaimer, the term of this patent is extended or adjusted under 35 U.S.C. 154(b) by 97 days.

(21) Appl. No.: 16/100,696

(22) Filed: Aug. 10, 2018

(65) Prior Publication Data
US 2019/0228503 A1    Jul. 25, 2019

(30) Foreign Application Priority Data

Jan. 23, 2018 (JP) .............................. JP2018-009010

(51) Int. Cl.
| G06K 9/36 | (2006.01) |
|---|---|
| G06T 3/40 | (2006.01) |
| G06T 7/593 | (2017.01) |
| G06T 7/73 | (2017.01) |
| G10L 15/07 | (2013.01) |
| G06T 19/20 | (2011.01) |
| G06F 3/01 | (2006.01) |
| G06T 3/00 | (2006.01) |
| G06F 3/0484 | (2013.01) |
| G06F 3/042 | (2006.01) |
| G06F 3/0481 | (2013.01) |
| G06F 3/03 | (2006.01) |
| G06F 3/0488 | (2013.01) |

(52) U.S. Cl.
CPC ............ *G06T 3/4038* (2013.01); *G06F 3/017* (2013.01); *G06F 3/0304* (2013.01); *G06F 3/042* (2013.01); *G06F 3/0425* (2013.01); *G06F 3/04815* (2013.01); *G06F 3/04845* (2013.01); *G06F 3/04883* (2013.01); *G06T 3/0006* (2013.01); *G06T 7/596* (2017.01); *G06T 7/73* (2017.01); *G06T 19/20* (2013.01); *G10L 15/07* (2013.01)

(58) Field of Classification Search
CPC ....... G06T 19/20; G06T 3/0006; G06T 7/596; G06T 7/73; G06T 3/4038; G06F 3/04883; G06F 3/042; G06F 3/04845; G06F 3/017; G06F 3/04815; G10L 15/07
USPC .......................................................... 382/284
See application file for complete search history.

(56) References Cited

U.S. PATENT DOCUMENTS

| 2002/0113752 | A1* | 8/2002 | Sullivan | ................. | G06T 15/00 |
|---|---|---|---|---|---|
| | | | | | 345/6 |
| 2010/0110384 | A1* | 5/2010 | Maekawa | .............. | G03B 35/18 |
| | | | | | 353/10 |
| 2010/0283838 | A1* | 11/2010 | Tomisawa | .............. | G02B 30/27 |
| | | | | | 348/51 |

(Continued)

FOREIGN PATENT DOCUMENTS

| JP | 2015-060295 A | 3/2015 |
|---|---|---|
| JP | 2016-095634 A | 5/2016 |
| JP | 2017-062709 A | 3/2017 |

*Primary Examiner* — Huy C Ho
(74) *Attorney, Agent, or Firm* — Oliff PLC

(57) ABSTRACT

An information processing device includes a controller. In a case where multiple images are formed in air in a depth direction, the controller controls a display of at least one of the images corresponding to one position or multiple positions in accordance with a command from a user.

19 Claims, 36 Drawing Sheets

(56) References Cited

U.S. PATENT DOCUMENTS

| | | | |
|---|---|---|---|
| 2015/0212335 A1* | 7/2015 | Shimatani | G02B 30/56 359/479 |
| 2016/0195849 A1* | 7/2016 | Takagi | G03H 1/2249 348/40 |
| 2019/0129192 A1* | 5/2019 | Yang | G02B 30/27 |

* cited by examiner

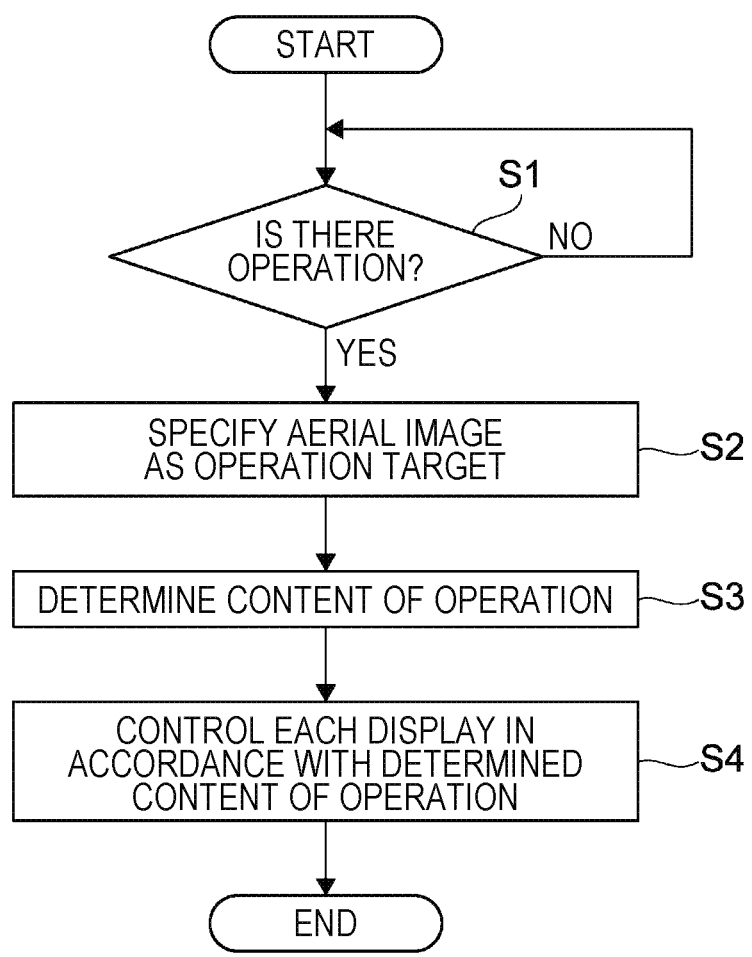

IMAGES ARE INTERCHANGED

SECOND DISPLAY IS DELETED

FIG. 32
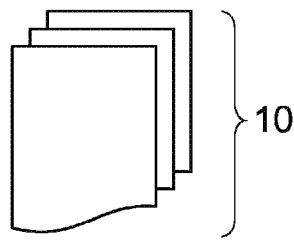
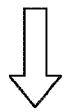
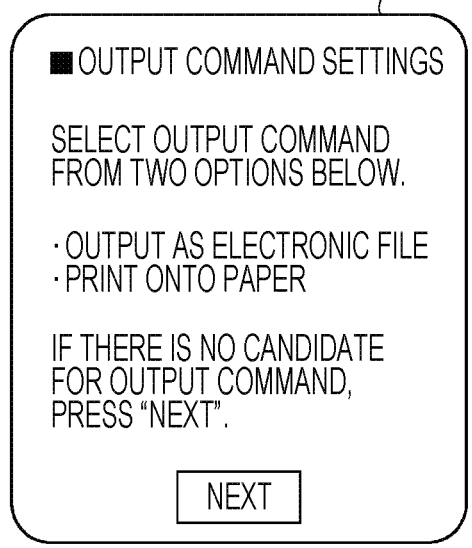
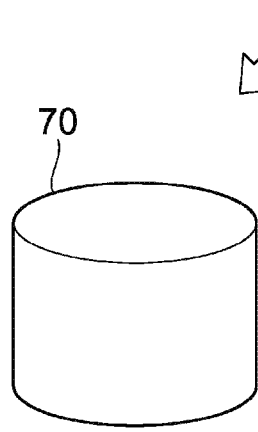
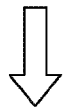
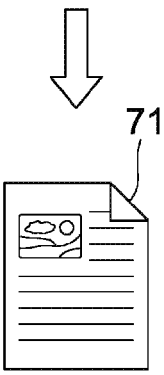
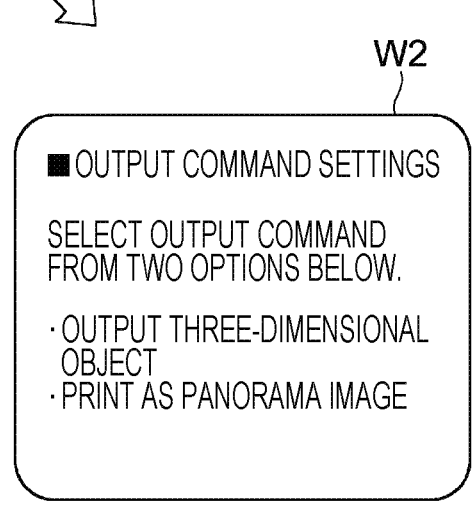

FIG. 35
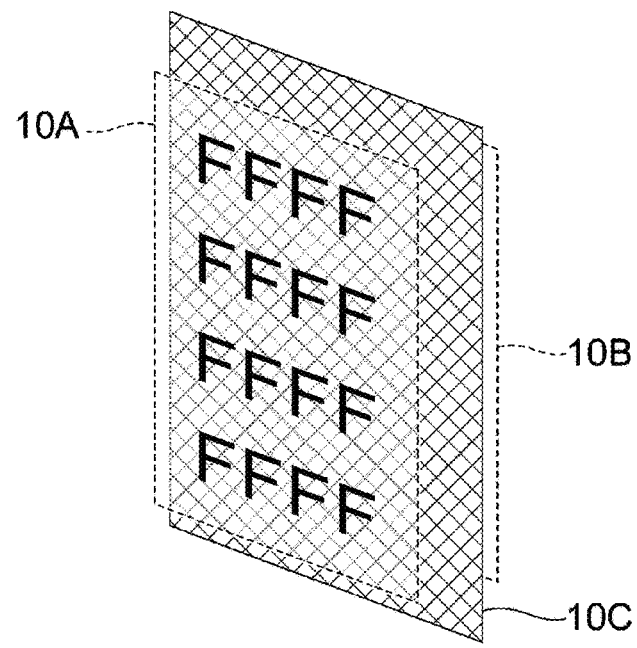
PRINT WITH NO 10C
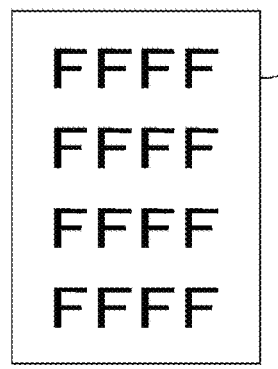
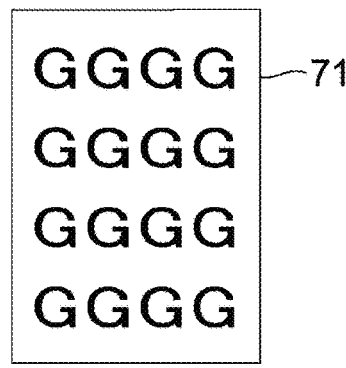
PRINT WITH 10C
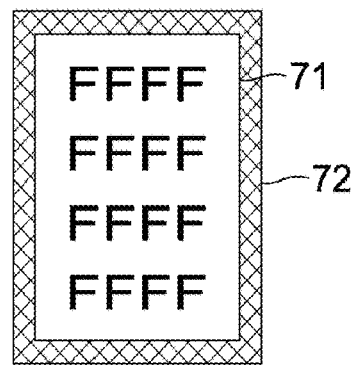
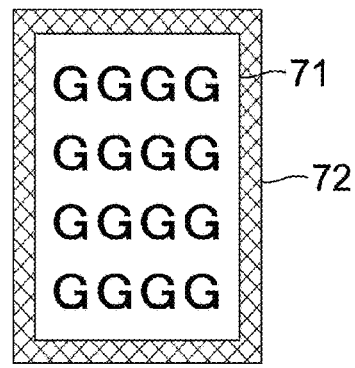

INFORMATION PROCESSING DEVICE, INFORMATION PROCESSING SYSTEM, AND NON-TRANSITORY COMPUTER READABLE MEDIUM

CROSS-REFERENCE TO RELATED APPLICATIONS

This application is based on and claims priority under 35 USC 119 from Japanese Patent Application No. 2018-009010 filed Jan. 23, 2018.

BACKGROUND

Technical Field

The present invention relates to information processing devices, information processing systems, and non-transitory computer readable media.

SUMMARY

According to an aspect of the invention, there is provided an information processing device including a controller. In a case where multiple images are formed in air in a depth direction, the controller controls a display of at least one of the images corresponding to one position or multiple positions in accordance with a command from a user.

BRIEF DESCRIPTION OF THE DRAWINGS

Exemplary embodiments of the present invention will be described in detail based on the following figures, wherein:

FIG. 10 is a flowchart illustrating a general outline of a process executed by an image formation controller according to the first exemplary embodiment;

FIG. 32 illustrates an output execution example in a case where an aerial image is a document;

FIG. 35 illustrates an operational example where aerial images are printed onto paper.

DETAILED DESCRIPTION

Exemplary embodiments of the present invention will be described below with reference to the drawings.

First Exemplary Embodiment

Schematic Configuration of Aerial-Image Forming System

Figure 1:
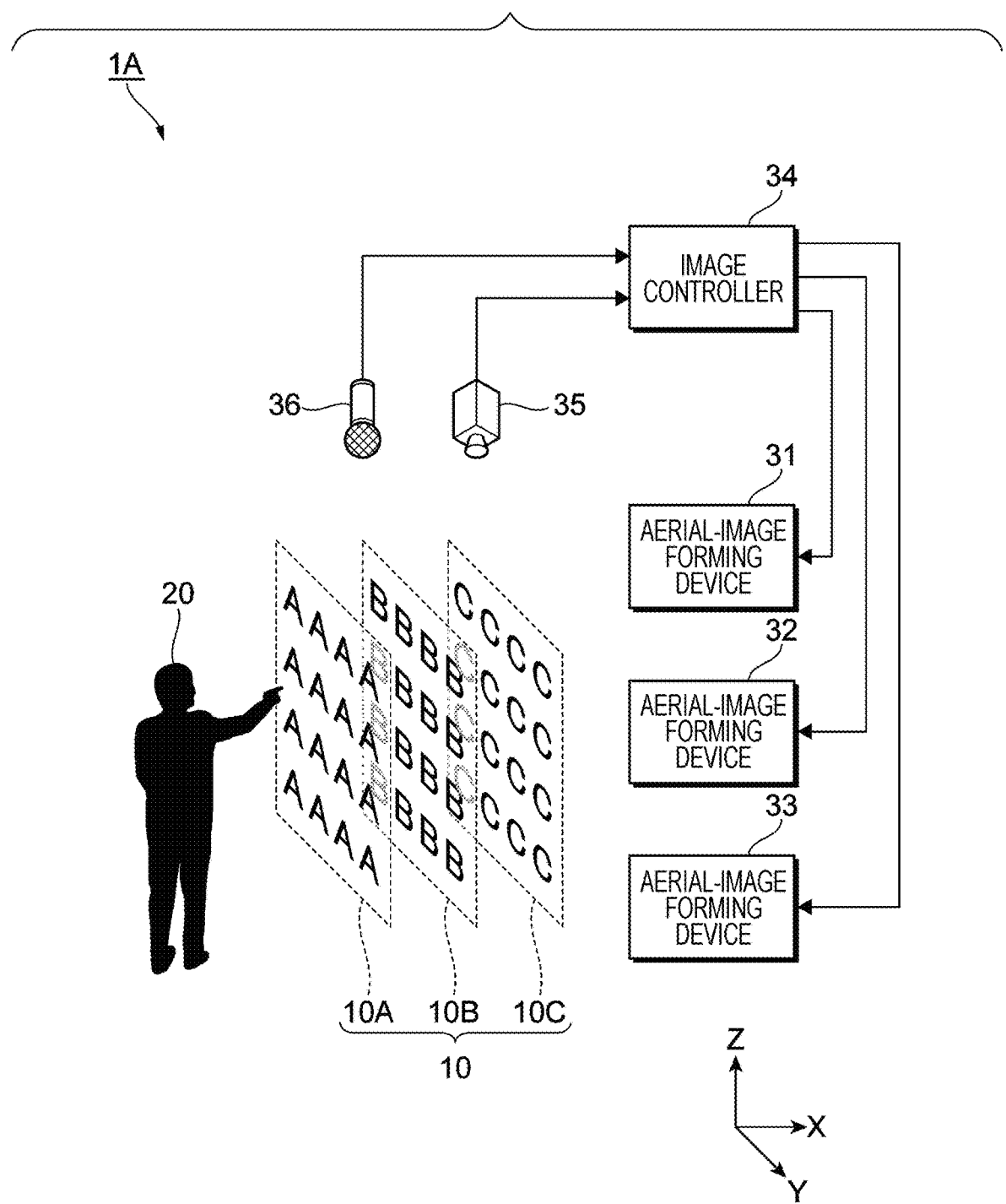
FIG. 1 schematically illustrates the configuration of an aerial-image forming system according to a first exemplary embodiment.

FIG. 1 schematically illustrates the configuration of an aerial-image forming system 1A according to a first exemplary embodiment. The aerial-image forming system 1A is an example of an information processing system.

In this exemplary embodiment, an aerial image 10 refers to an image formed in the air such that the state of light equivalent to reflection light from an object is reproduced.

Since the aerial image 10 is formed as if the image floats in the air, a person is capable of passing through the aerial image 10.

In the aerial image 10, for example, a guidance screen or an advertisement screen is displayed. Furthermore, for example, an operation screen in which the display content is changeable in response to an operation performed by a person 20 may be displayed in the aerial image 10. Needless to say, each of these screens is an example of a display.

In the aerial image 10, a moving image in addition to a still image may be displayed.

Although the aerial image 10 entirely has a rectangular shape in each of the following exemplary embodiments, the shape that defines the outer edge of the aerial image 10 is not limited to a rectangular shape and may be a freely-chosen shape. For example, a space in which an image of an object is formed may be the entire space in which the aerial image 10 is formed. Examples of the aerial image 10 include an image of an operation button, an image of a person, an image of an animal, an image of a product, and an image of a fruit. Although the aerial image 10 is flat in FIG. 1, the aerial image 10 may have a three-dimensional shape, such as a curved shape, a spherical shape, or a cubical shape.

The aerial image 10 may be disposed as a single image or may be disposed as multiple images within a single space. In FIG. 1, three flat aerial images 10A, 10B, and 10C are sequentially arranged in the depth direction from the person 20.

In the case of FIG. 1, the aerial image 10A is constituted of "AAAA/AAAA/AAAA/AAAA". The slashes used here each indicate a line feed. The same applies to the aerial images 10B and 10C. The aerial image 10B is constituted of "BBBB/BBBB/BBBB/BBBB", and the aerial image 10C is constituted of "CCCC/CCCC/CCCC/CCCC".

In the example in FIG. 1, the aerial images 10A, 10B, and 10C are arranged in an adjoining fashion and face each other with a predetermined distance therebetween.

For example, this arrangement is used when a first page of a document is to be displayed in the aerial image 10A, a second page of the document is to be displayed in the aerial image 10B, and a third page of the document is to be displayed in the aerial image 10C.

An example in which multiple aerial images 10 are arranged in the depth direction from the person 20 is not limited to a case where individual pages constituting a document are arranged. For example, such an example is also used for a figure arrangement or an expression having a layered structure.

Figure 2A:
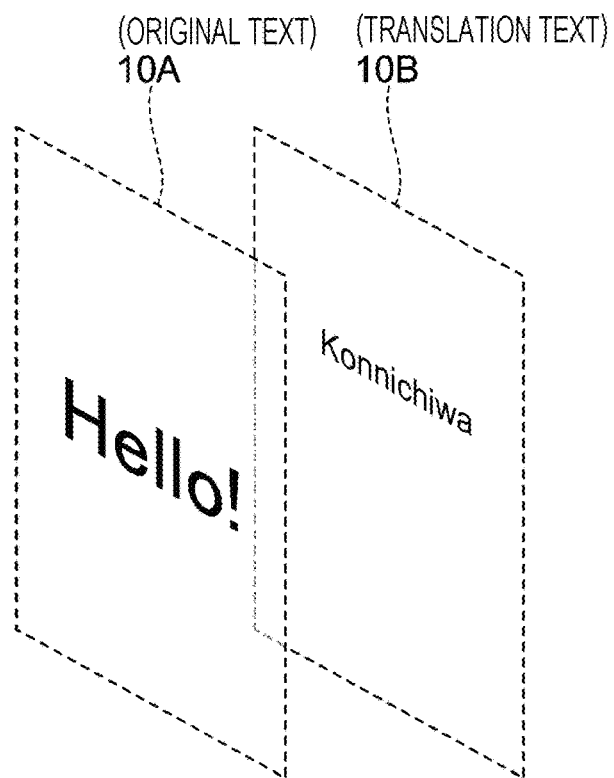
FIGS. 2A and 2B illustrate an example of an expression having a layered structure.
Figure 2B:

FIGS. 2A and 2B illustrate an example of an expression having a layered structure. Specifically, FIG. 2A illustrates an example in which an aerial image 10A corresponding to original text is displayed at the front side and an aerial image 10B corresponding to translation text is displayed at the rear side, and FIG. 2B illustrates how the aerial images 10A and 10B appear from the front.

In the example shown in FIGS. 2A and 2B, the aerial image 10B at the rear side is visually recognizable through the aerial image 10A. In the example in FIGS. 2A and 2B, for the purpose of displaying the translation text along with the original text, a character string "Hello" constituting the aerial image 10A and a character string "Konnichiwa" constituting the aerial image 10B are positioned so as not to overlap each other.

As an alternative to the example in FIGS. 2A and 2B in which the translation text is displayed in the aerial image 10B located at the rear side, descriptive text or a comment may be displayed in the aerial image 10B. As another alternative, the translation text may be displayed in the aerial image 10A at the front side, and the original text may be displayed in the aerial image 10B at the rear side.

However, the elements constituting the aerial images 10A and 10B, such as text, figures, and symbols, may possibly overlap each other between the two aerial images. If the content of the aerial image 10 at the front side and the content of the aerial image 10B at the rear side are visually recognized in an overlapping manner, the visibility of the content of the aerial image 10A located at the front side decreases.

In such a case, for example, the visibility of the aerial image 10B located at the rear side may be intentionally reduced (e.g., the brightness of the aerial image 10B may be reduced), so that the visibility of the aerial image 10A located at the front side is increased.

Alternatively, a third aerial image constituting of a color or a pattern (e.g., a lattice or a repetitive pattern) that reduces the visibility of the aerial image 10B may be added or inserted to a position between the aerial image 10A and the aerial image 10B. The third aerial image in this case may have an opposite color from the aerial image 10A so as to not to reduce the visibility of the aerial image 10A.

Referring back to FIG. 1, the aerial-image forming system 1A shown in FIG. 1 includes aerial-image forming devices 31, 32, and 33 that form aerial images 10 in the air, an image controller 34 that controls the aerial-image forming devices 31, 32, and 33, an imaging camera 35 that receives an operation performed on an aerial image 10 by the person 20 as an imaging command, and a microphone 36 that converts a voice of the person 20 into an electric signal.

In this exemplary embodiment, the aerial-image forming device 31 is provided for forming the aerial image 10A, the aerial-image forming device 32 is provided for forming the aerial image 10B, and the aerial-image forming device 33 is provided for forming the aerial image 10C.

Each of the aerial-image forming devices 31, 32, and 33 is an example of an image forming unit. Specific examples of the aerial-image forming devices 31, 32, and 33 will be described later.

The image controller 34 determines the content of an operation performed by the person 20 and controls the formation of the aerial images 10A, 10B, and 10C. The image controller 34 determines the content of the operation by using a technology (image recognition) for recognizing an image input from the imaging camera 35 and a technology (voice recognition) for recognizing a voice input from the microphone 36.

For example, the image controller 34 analyzes a finger or hand motion of the person 20 so as to specify an aerial image as an operation target or to determine the content of an operation performed on the specified aerial image.

Alternatively, the image controller 34 may determine the content of an operation by receiving a notification signal from a terminal (such as a remote controller).

The image controller 34 is an example of a controller. The image controller 34 is also an example of an information processing device.

For example, the imaging camera 35 is disposed at a position where an image of a finger or hand motion of the person 20 is acquirable. The imaging camera 35 may include the face of the person 20 in the imaging range thereof. The content of an operation is determinable from the facial expression or the visual-line direction so long as the image of the face is acquired.

Although only a single imaging camera 35 is shown in FIG. 1, multiple imaging cameras 35 may be provided. The multiple imaging cameras 35 may be installed at different positions and may have different imaging directions. With different installation positions and different imaging directions, blind spots are reduced, thereby increasing the accuracy for detecting or determining an operation performed by the person 20.

As an alternative to the imaging camera 35 used in FIG. 1, a different type of sensor may be used.

The imaging camera 35 is an example of a detector.

The microphone 36 is used when the person 20 uses his/her voice to indicate the content of an operation. The microphone 36 is also an example of a detector.

Example of Aerial-Image Forming Device

A principle of how an aerial image 10 is formed will now be described with reference to FIGS. 3A to 7.

Figure 3A:
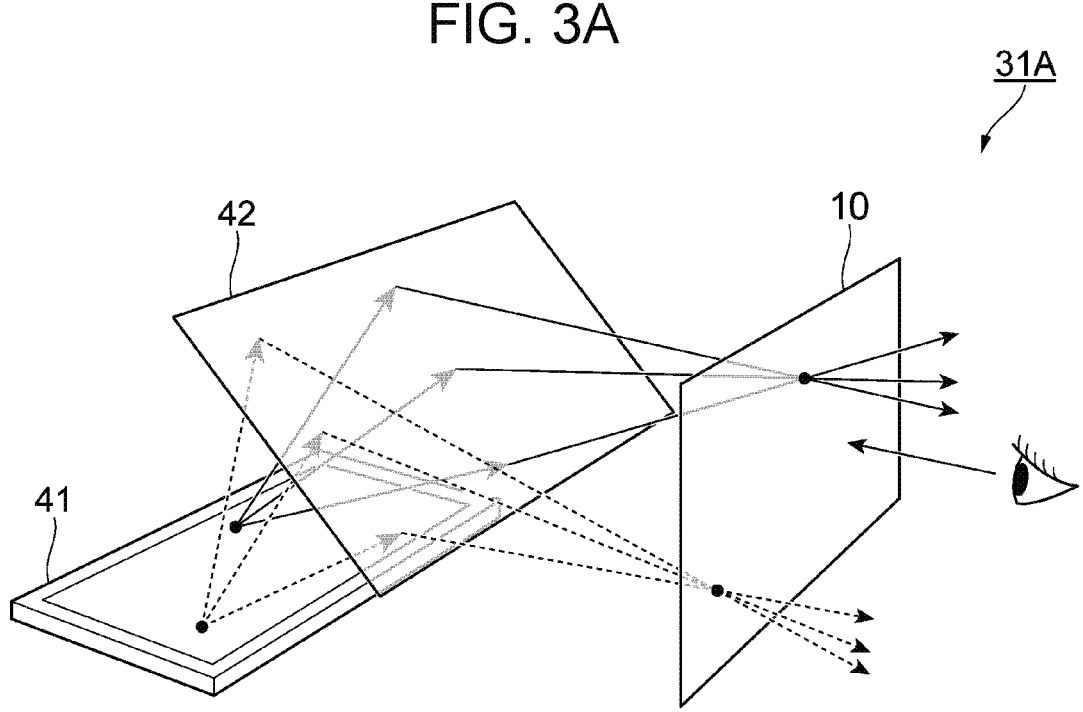
FIGS. 3A and 3B are principle diagrams of an aerial-image forming device that forms an aerial image by causing light output from a display unit to be transmitted through a dedicated optical plate, FIG. 3A illustrating the positional relationship between each component and the aerial image, FIG. 3B illustrating a part of the cross-sectional structure of the optical plate.
Figure 3B:
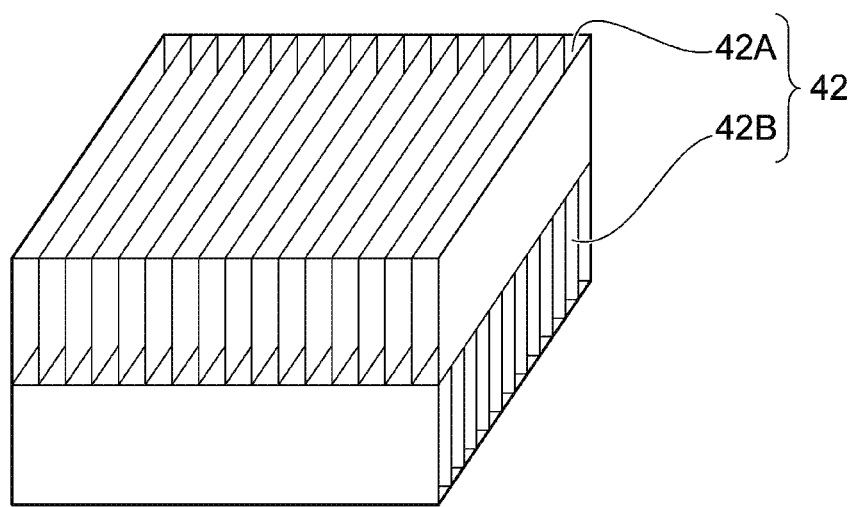

FIGS. 3A and 3B are principle diagrams of an aerial-image forming device 31A that forms an aerial image 10 by causing light output from a display unit 41 to be transmitted through a dedicated optical plate 42. Specifically, FIG. 3A illustrates the positional relationship between each component and the aerial image 10, and FIG. 3B illustrates a part of the cross-sectional structure of the optical plate 42. The display unit 41 and the optical plate 42 are examples of optical components.

The optical plate 42 has a laminated structure constituted of an upper plate having an array of glass strips 42A whose wall surfaces are used as mirrors and a lower plate having an array of glass strips 42B oriented orthogonally to the glass strips 42A.

The optical plate 42 causes the light output from the display unit 41 to be reflected twice by the glass strips 42A and 42B so that an image of the light is formed in the air, whereby an image displayed on the display unit 41 is reproduced in the air. The distance between the display unit 41 and the optical plate 42 is equal to the distance between the optical plate 42 and the aerial image 10. Moreover, the size of the image displayed on the display unit 41 is equal to the size of the aerial image 10.

Figure 4:
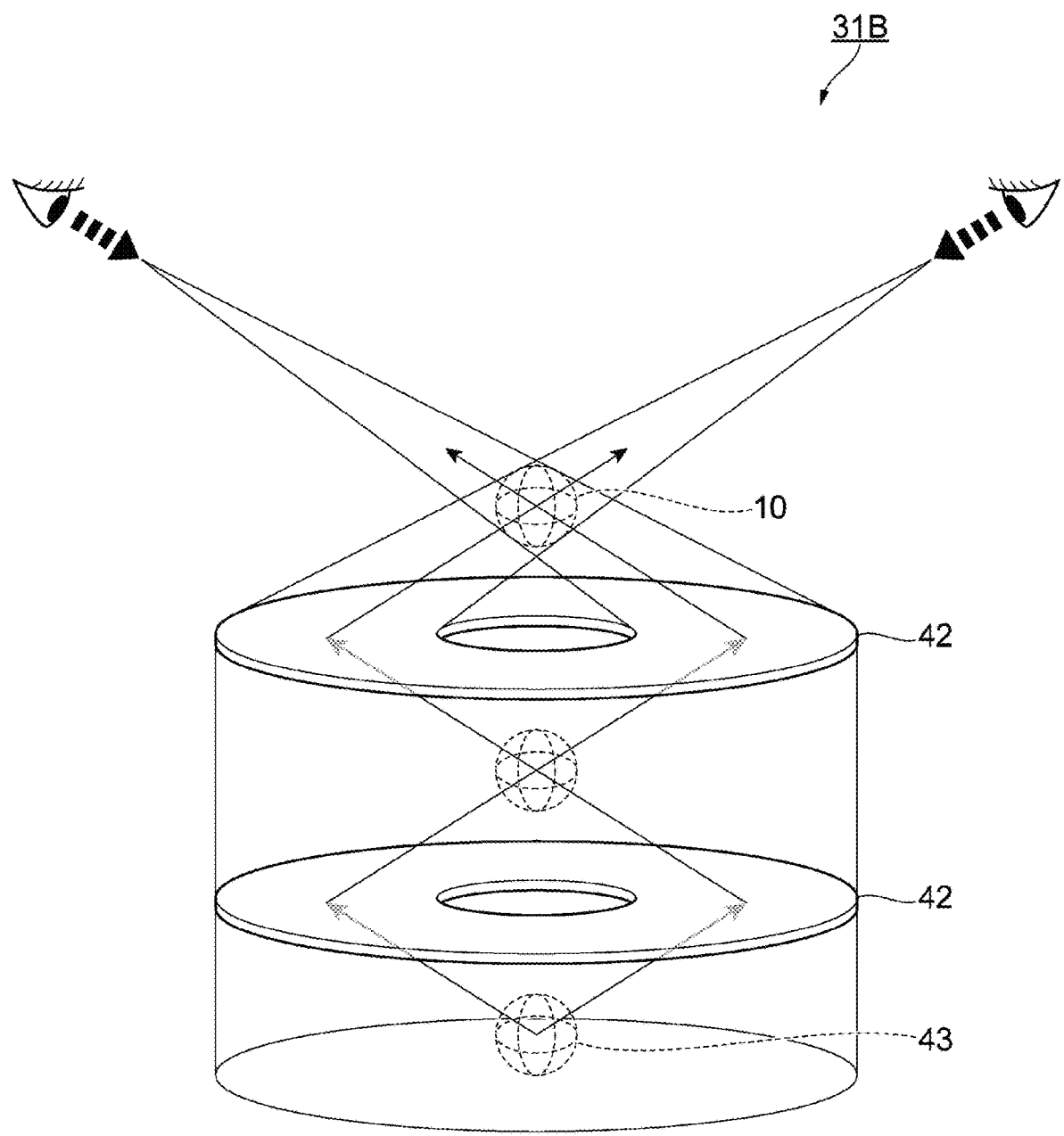
FIG. 4 is a principle diagram of an aerial-image forming device that forms a three-dimensional image as an aerial image.

FIG. 4 is a principle diagram of an aerial-image forming device 31B that forms a three-dimensional image as the aerial image 10. The aerial-image forming device 31B causes light reflected by the surface of an actual object 43 to be transmitted twice through ring-shaped optical plates 42, so as to reproduce a three-dimensional image (aerial image 10) in the air. The optical plates 42 do not have to be arranged in series.

Figure 5A:
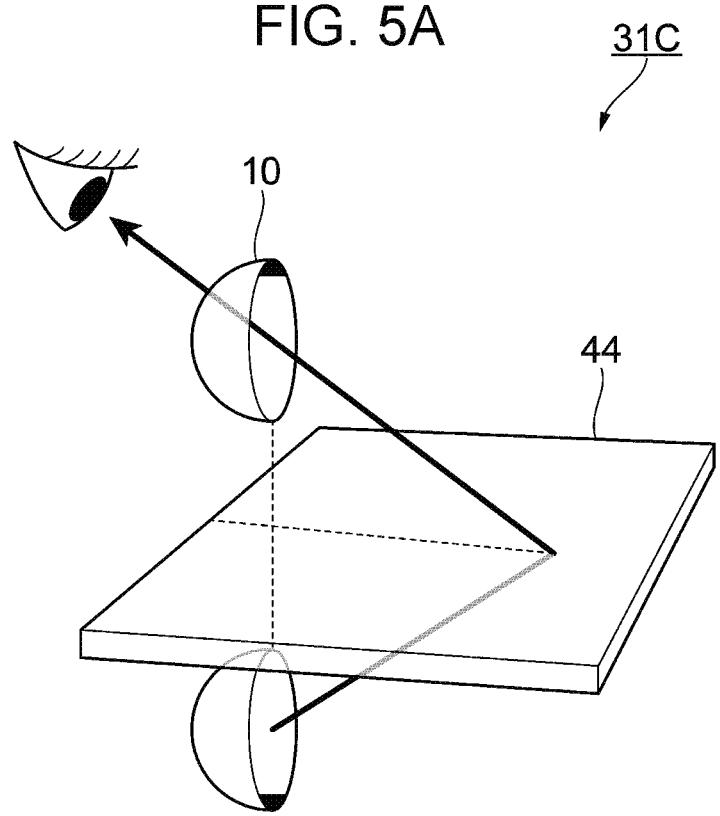
FIGS. 5A and 5B are principle diagrams of an aerial-image forming device that forms an aerial image by using a micro mirror array having micro square holes that constitute a dihedral corner reflector and that are evenly arranged within a plane, FIG. 5A illustrating the positional relationship between each component and the aerial image, FIG. 5B being an enlarged view of a part of the micro mirror array.
Figure 5B:
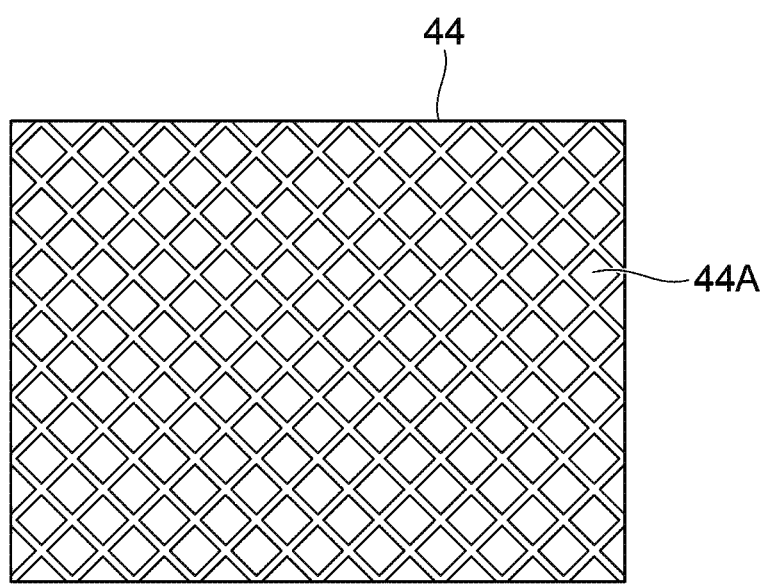

FIGS. 5A and 5B are principle diagrams of an aerial-image forming device 31C that forms an aerial image 10 by using a micro mirror array 44 having micro square holes 44A that constitute a dihedral corner reflector and that are evenly arranged within a plane. Specifically, FIG. 5A illustrates the positional relationship between each component and the aerial image 10, and FIG. 5B is an enlarged view of a part of the micro mirror array 44. Each of the holes 44A has, for example, 100 μm sides. The micro mirror array 44 is an example of an optical component.

Figure 6:
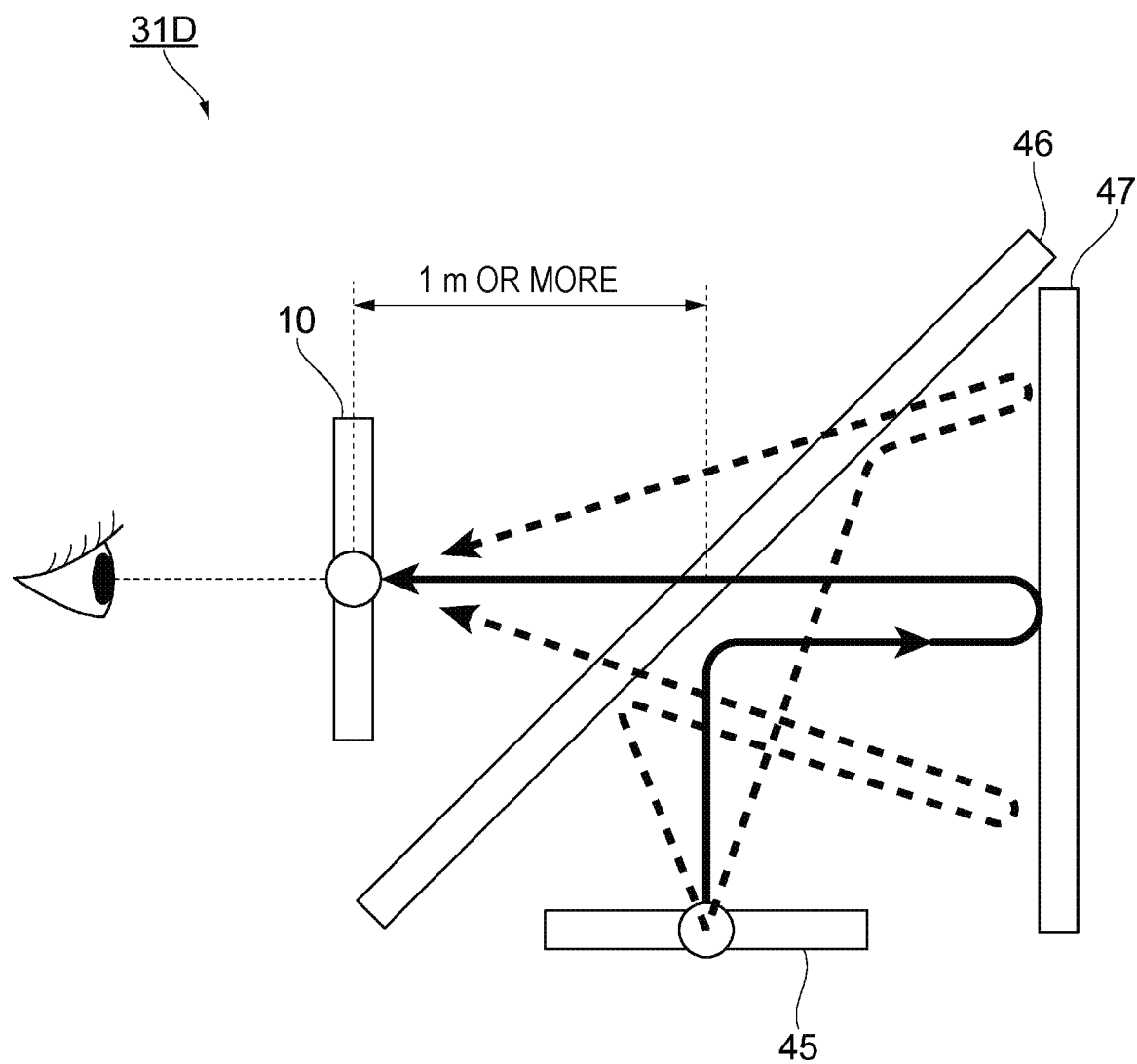
FIG. 6 is a principle diagram of an aerial-image forming device equipped with a beam splitter and a retroreflector sheet.

FIG. 6 is a principle diagram of an aerial-image forming device 31D equipped with a beam splitter 46 and a retroreflector sheet 47. The beam splitter 46 is disposed at an angle of 45° relative to the display face of a display unit 45. The retroreflector sheet 47 is disposed at an angle of 90° relative to the display face of the display unit 45 in a direction in which the display image is reflected by the beam splitter 46. The display unit 45, the beam splitter 46, and the retroreflector sheet 47 are examples of optical components.

In the case of the aerial-image forming device 31D, light output from the display unit 45 is reflected toward the retroreflector sheet 47 by the beam splitter 46, is subsequently retro-reflected by the retroreflector sheet 47, and is transmitted through the beam splitter 46, so that an image of the light is formed in the air. An aerial image 10 is formed at the position where the light is imaged.

Figure 7:
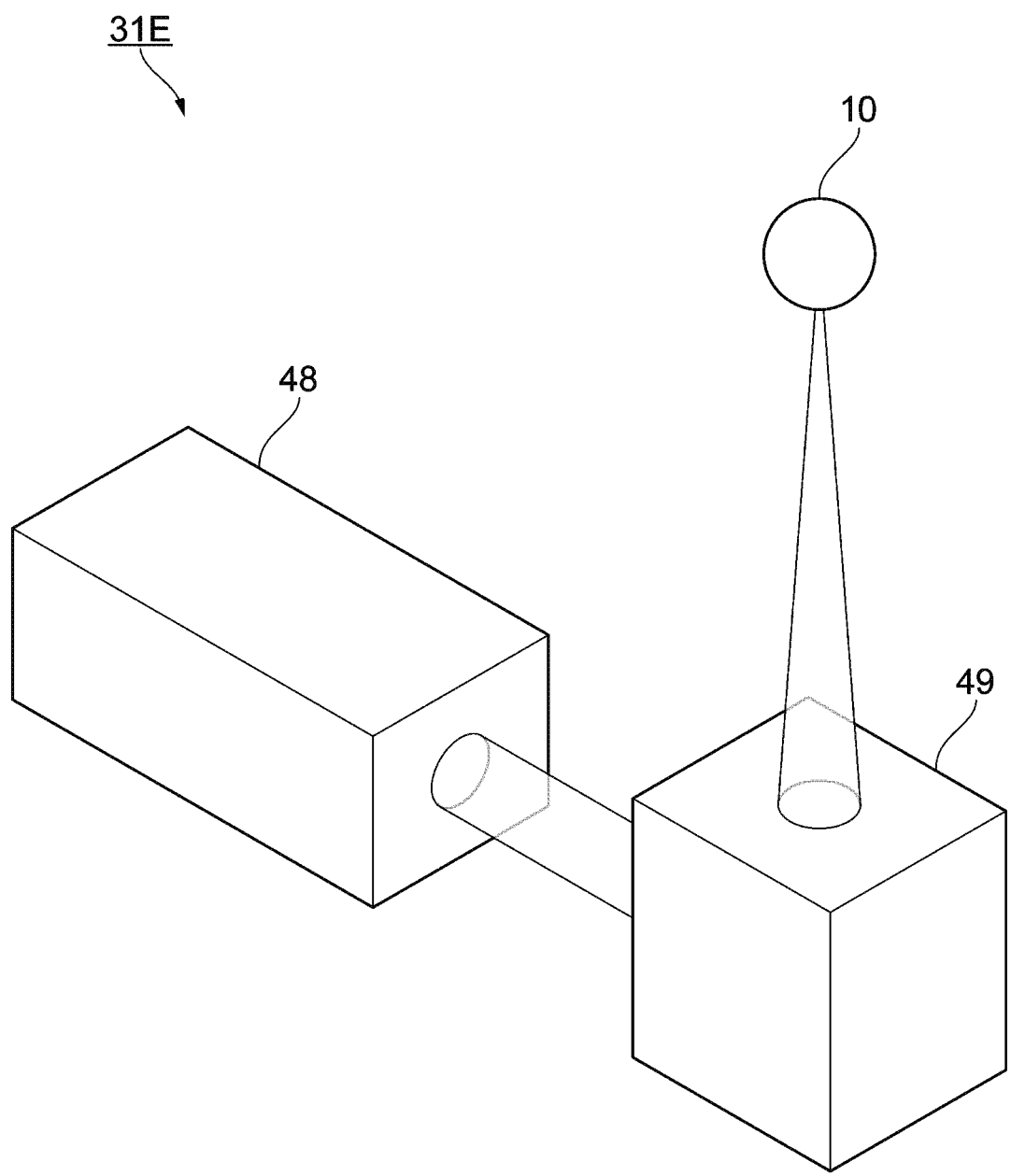
FIG. 7 is a principle diagram of an aerial-image forming device that forms an aerial image as a group of plasma emission bodies.

FIG. 7 is a principle diagram of an aerial-image forming device 31E that forms an aerial image 10 as a group of plasma emission bodies.

In the case of the aerial-image forming device 31E, an infrared pulse laser 48 outputs a pulsed laser beam, and an XYZ scanner 49 focuses the pulsed laser beam in the air. In this case, gas near the focal point instantaneously becomes plasma and thus emits light. The pulse frequency is, for example, 100 Hz or lower, and the pulse emission time is, for example, on the order of nanoseconds. The infrared pulse laser 48 and the XYZ scanner 49 are examples of optical components.

Configuration of Image Controller 34

Figure 8:
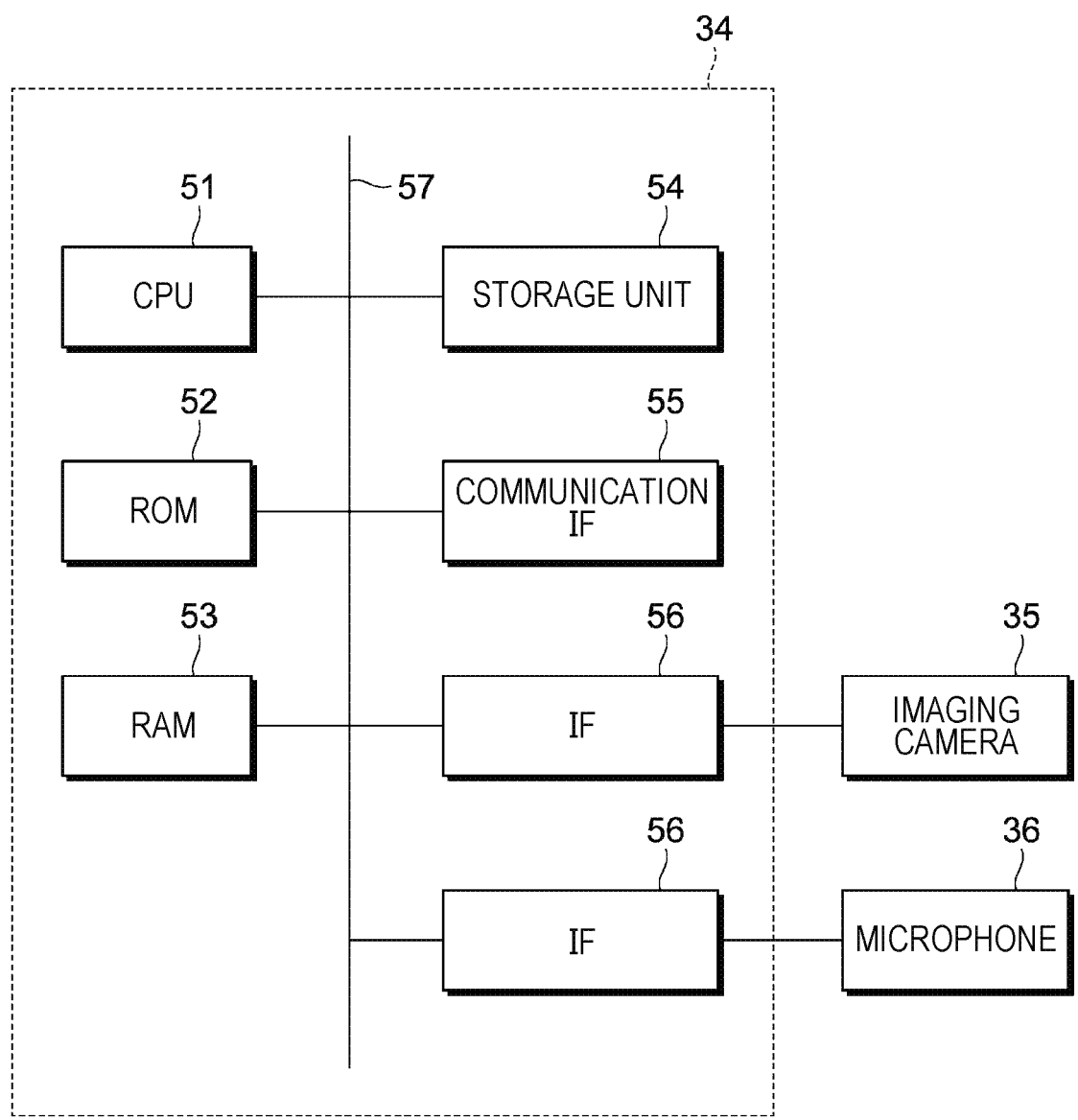
FIG. 8 illustrates an example of a hardware configuration of an image controller according to the first exemplary embodiment.

FIG. 8 illustrates an example of a hardware configuration of the image controller 34 according to the first exemplary embodiment.

The image controller 34 includes a central processing unit (CPU) 51 that provides various types of functions by executing firmware and application programs, a read-only memory (ROM) 52 as a storage area that stores firmware and a basic input output system (BIOS), and a random access memory (RAM) 53 as an area where a program is executed. The CPU 51, the ROM 52, and the RAM 53 constitute an example of a so-called computer.

The image controller 34 has a storage unit 54 that stores data, such as an application program. The storage unit 54 uses, for example, a rewritable nonvolatile storage medium for storing information.

The image controller 34 controls the aerial-image forming devices 31 to 33 by using a communication interface (communication IF) 55, so as to change the formation of aerial images 10. The control in this case includes controlling the positions where aerial images 10 are to be formed and the size thereof. The positions include not only two-dimensional positions but also three-dimensional positions.

The image controller 34 uses an interface (IF) 56 to communicate with the imaging camera 35 and the microphone 36.

The CPU 51 and each of the units are connected via a bus 57.

Figure 9:
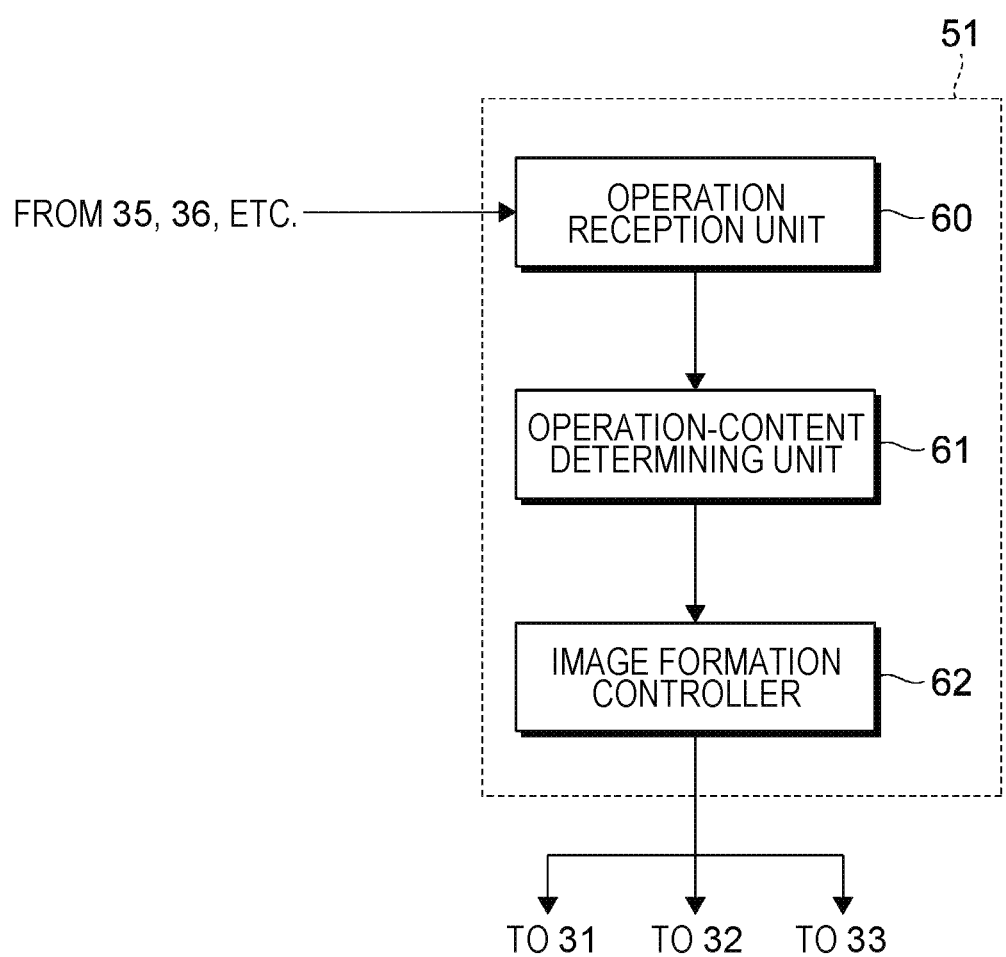
FIG. 9 illustrates an example of a functional configuration of the image controller according to the first exemplary embodiment.

FIG. 9 illustrates an example of a functional configuration of the image controller 34 (see FIG. 8) according to the first exemplary embodiment.

The functional configuration shown in FIG. 9 is realized by the CPU 51 executing a program.

The CPU 51 functions as an operation reception unit 60 that receives an operation performed on aerial images 10 (see FIG. 1) by the person 20 (see FIG. 1) within a space in which the aerial images 10 is formed, an operation-content determining unit 61 that determines the content of the received operation, and an image formation controller 62 that controls the formation of the aerial images 10 in accordance with the determined content of the operation.

The operation reception unit 60 processes image data input from the imaging camera 35 or voice data input from the microphone 36 so as to receive an operation performed on the aerial images 10 by the person 20.

For example, in a case where a predetermined finger or hand motion is detected in a state where the person 20 is standing in a predetermined space (e.g., a predetermined range in front of the aerial image 10A), the operation reception unit 60 receives the finger or hand motion as an operation performed on the aerial images 10 by the person 20.

In a case where, for example, a predetermined voice is detected, the operation reception unit 60 receives the voice as an operation performed by the person 20.

The operation-content determining unit 61 determines whether the content of the operation indicates an operation command for changing the arranged order of images displayed as the aerial images 10A to 10C (see FIG. 1), an operation command for deleting a specific image from the display, or an operation performed on a specific button constituting an image.

Although the operation reception unit 60 and the operation-content determining unit 61 are treated as different processing units in this exemplary embodiment, the two units may alternatively be treated as a single processing unit.

The image formation controller 62 commands the aerial-image forming devices 31 to 33 (see FIG. 1) to change the contents of the aerial images 10A to 10C to be formed or to change the positions where the aerial images 10A to 10C are to be formed.

Process of Image Formation Controller

FIG. 10 is a flowchart illustrating a general outline of a process executed by the image formation controller 62 (see FIG. 9) according to the first exemplary embodiment. Since the flowchart illustrates a general outline, the details thereof vary depending on individual usage.

In step S1, the image formation controller 62 determines whether or not an operation is detected.

If a negative result is obtained in step S1, the image formation controller 62 repeats the determination until an operation is detected.

If a positive result is obtained in step S1, the image formation controller 62 specifies an aerial image as an operation target in step S2. In a case where overlapping between a hand or a finger and a specific aerial image is detected, the aerial image overlapping with the hand or finger is the operation target. If a hand or a finger does not overlap with any of the aerial images 10A to 10C (see FIG. 1), the front-most aerial image is set as the operation target.

Subsequently, in step S3, the image formation controller 62 determines the content of the operation. For example, an operation performed with respect to the arranged order of the specified aerial image is determined. Changing the arranged order involves, for example, shifting an aerial image toward the front side from the current position or shifting an aerial image toward the rear side from the current position. Specifically, there is a command for shifting the content displayed as the aerial image 10B (see FIG. 1) to the aerial image 10A.

Then, in step S4, the image formation controller 62 controls each display in accordance with the determined content of the operation. For example, the image formation controller 62 gives an indication about the content of an image to be formed and the position at which the image is to be formed to each of the aerial-image forming devices 31 to 33 (see FIG. 1).

A positional indication includes, for example, parallel movement and rotational movement. In these movements, the size of the aerial image is maintained. The term "parallel movement" refers to linear movement executed without changing the tilt angle of the display face before and after the movement. The term "rotational movement" refers to movement that involves rotation about a predetermined virtual axis.

For example, in a case where an aerial image is formed in accordance with the method shown in FIGS. 3A and 3B, a moving mechanism (not shown) is used to move the display unit 41 (see FIGS. 3A and 3B) and the optical plate 42 (see FIGS. 3A and 3B) together in one direction, thereby shifting the aerial image in a parallel fashion. The moving mechanism in this case is, for example, a uniaxial actuator. The display unit 41 and the optical plate 42 are moved along a guide mechanism. The moving distance and the position after the movement are detected by a position detector (not shown).

In a case where an aerial image 10 is to be formed in accordance with the method shown in FIG. 4 or FIGS. 5A and 5B, the actual object may be positionally moved. In a case where an aerial image 10 is to be formed in accordance with the method shown in FIG. 6, the display unit 45 (see FIG. 6) may be positionally moved parallel to the display face. In a case where an aerial image 10 is to be formed in accordance with the method shown in FIG. 7, the infrared pulse laser 48 (see FIG. 7) and the XYZ scanner 49 (see FIG. 7) may be moved together in a parallel fashion.

Furthermore, in a case where an aerial image 10 is formed in accordance with the method shown in FIGS. 3A and 3B, a rotating mechanism (not shown) may be used to rotate the display unit 41 and the optical plate 42 together, thereby rotating the aerial image 10. The rotating mechanism in this case is, for example, a motor. The display unit 41 (see FIGS. 3A and 3B) and the optical plate (see FIGS. 3A and 3B) are rotated together about a rotation axis. The rotational angle and the rotational direction are detected by a position detector (not shown). Depending on the direction of rotation applied to the aerial image 10, the optical plate 42 alone may be rotated.

In a case where an aerial image 10 is to be formed in accordance with the method shown in FIG. 4 or FIGS. 5A and 5B, the actual object may be rotated. In a case where an aerial image 10 is to be formed in accordance with the method shown in FIG. 6, the display unit 45 (see FIG. 6) may be rotated. In a case where an aerial image 10 is to be formed in accordance with the method shown in FIG. 7, the infrared pulse laser 48 (see FIG. 7) and the XYZ scanner 49 (see FIG. 7) may be rotated together, or the coordinates to be applied to the XYZ scanner 49 may be changed to the coordinates after the rotation.

Control Examples

First Control Example

The following description relates to a case where an aerial image as an operation target is specified in accordance with an operation of inserting a finger into aerial images formed in the air, and the arranged order of the display contents is changed.

The arranged order is changeable by, for example, interchanging image data to be transmitted to the aerial-image forming devices 31 to 33 (see FIG. 1).

The arranged order is also changeable by, for example, shifting the physical positions of aerial images 10A to 10C to be formed by the aerial-image forming devices 31 to 33 (see FIG. 1).

Figure 11A:
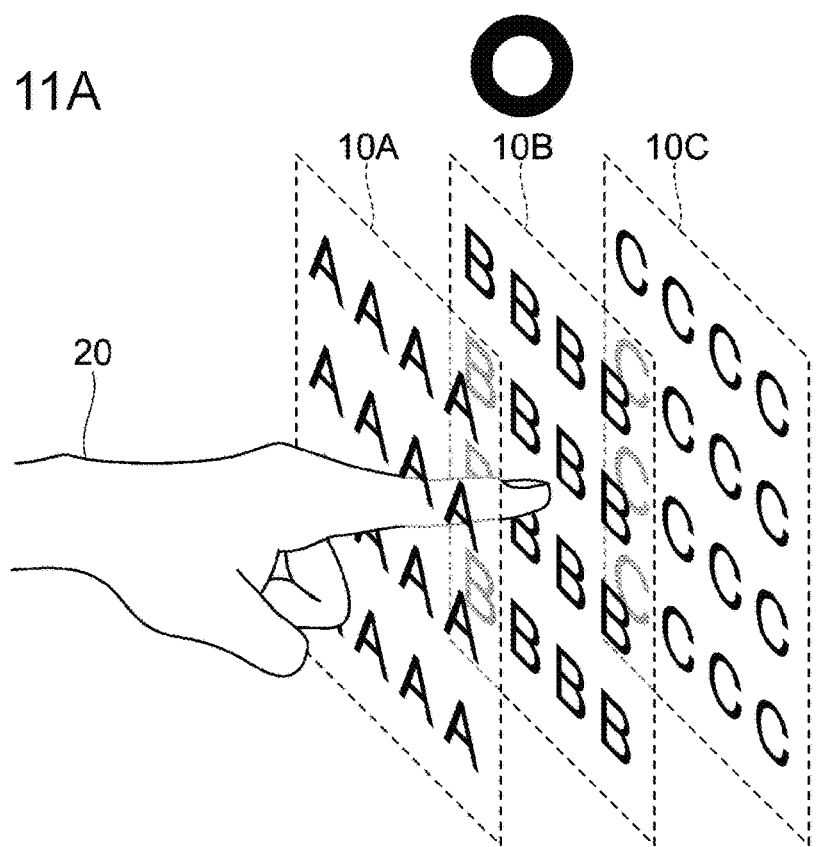
FIGS. 11A and 11B illustrate a control example where a finger inserted in the depth direction through an aerial image located at the front side overlaps a second aerial image, FIG. 11A illustrating a state where the finger is inserted from the front side, FIG. 11B illustrating an example where images are interchanged.
Figure 11B:
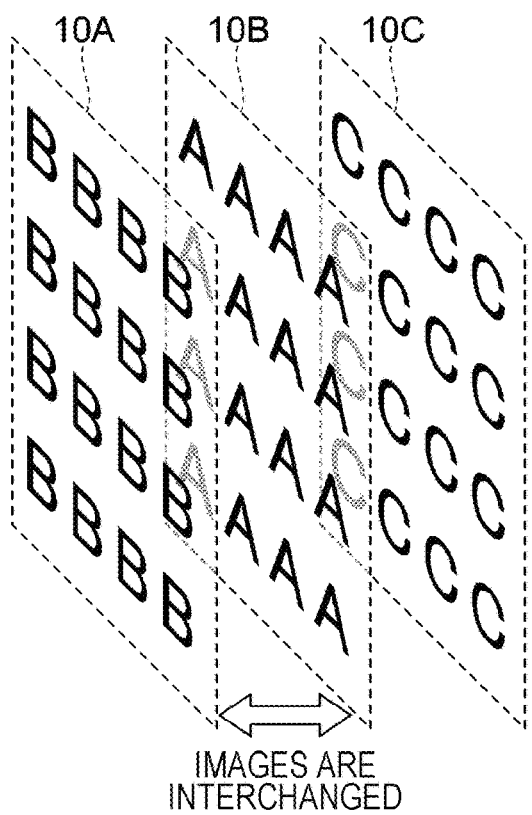

FIGS. 11A and 11B illustrate a control example where a finger inserted in the depth direction through the aerial image 10A located at the front side overlaps the second aerial image 10B. Specifically, FIG. 11A illustrates a state where the finger is inserted from the front side, and FIG. 11B illustrates an example where images are interchanged.

In this case, the finger is an example of a body part of the person 20. A hand is also an example of a body part of the person 20. Alternatively, a pointing stick or a writing tool may be used for specifying an aerial image 10 as an operation target. A body part, a pointing stick, or a writing tool is an example of an object used for specifying an aerial image.

In the operation of inserting a finger in the depth direction from the front side, the finger first overlaps the aerial image 10A and subsequently overlaps the aerial image 10B.

In this exemplary embodiment, an aerial image overlapping with the finger when the finger stops moving is specified as an operation target. Specifically, the aerial image 10B is specified as an operation target.

In a case where overlapping with multiple aerial images is detected, an aerial image located at the rear side may be specified as an operation target, or an aerial image detected that it overlaps with a body part temporally later may be specified as an operation target.

Depending on the detection method, the area of a section where an aerial image and a body part overlap each other may be determined. In this case, for example, an aerial image whose area of overlapping section is smaller than a predetermined size may be specified as an operation target. Furthermore, for example, an aerial image having a smaller area of overlapping section may be specified as an operation target.

For the purpose of reducing false detection, a condition in which the detection of overlapping continues for a predetermined time period or longer may be set.

In the example shown in FIGS. 11A and 11B, the image "BBBB/BBBB/BBBB/BBBB" previously displayed at the position of the aerial image 10B specified as an operation target is displayed at the position of the aerial image 10A at the front side. The image "AAAA/AAAA/AAAA/AAAA" displayed at the position of the aerial image 10A prior to the operation is now displayed at the position of the aerial image 10B at the rear side.

Specifically, FIGS. 11A and 11B illustrate an example where the content of the first display from the front is interchanged with the content of the second display from the front.

This control is realizable by preliminarily setting a rule for interchanging the content of the specified aerial image and the content of the front-most aerial image.

When applying this rule, if the image specified as an operation target is the third page from the front, the first page and the third page are interchanged with each other.

Figure 12A:
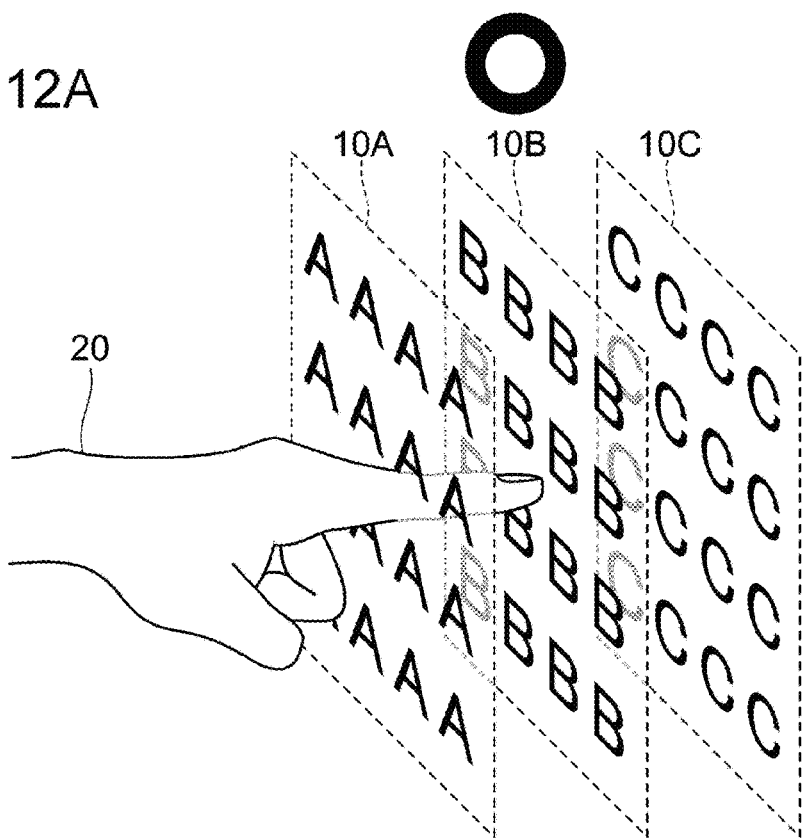
FIGS. 12A and 12B illustrate another control example where a finger inserted in the depth direction through an aerial image located at the front side overlaps a second aerial image, FIG. 12A illustrating a state where the finger is inserted from the front side, FIG. 12B illustrating an example where images have been shifted.
Figure 12B:
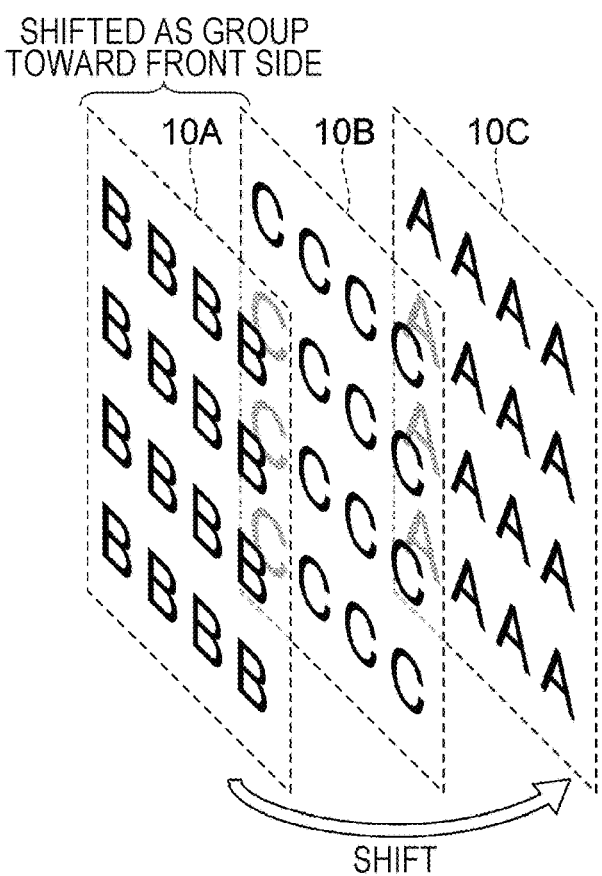

FIGS. 12A and 12B illustrate another control example where a finger inserted in the depth direction through the aerial image 10A located at the front side overlaps the second aerial image 10B. Specifically, FIG. 12A illustrates a state where the finger is inserted from the front side, and FIG. 12B illustrates an example where images have been shifted.

The control example shown in FIGS. 12A and 12B indicates a rule that causes the contents located behind an aerial image 10 specified as an operation target to be shifted one-by-one toward the front side so that the content displayed in the specified aerial image 10 is located at the front-most side.

In this rule, aerial images located in front of the aerial image located at the specified position are shifted together (as a group) toward the rear side.

In other words, the control example shown in FIGS. 12A and 12B corresponds to a rule that causes the display positions to be shifted in a loop fashion.

By using this control method, even if a large number of aerial images are disposed at the rear side and a finger is not reachable to the position of an aerial image displaying the content as an operation target, the desired content may be displayed at the front-most side after repeating the operation a certain number of times.

Figure 13A:
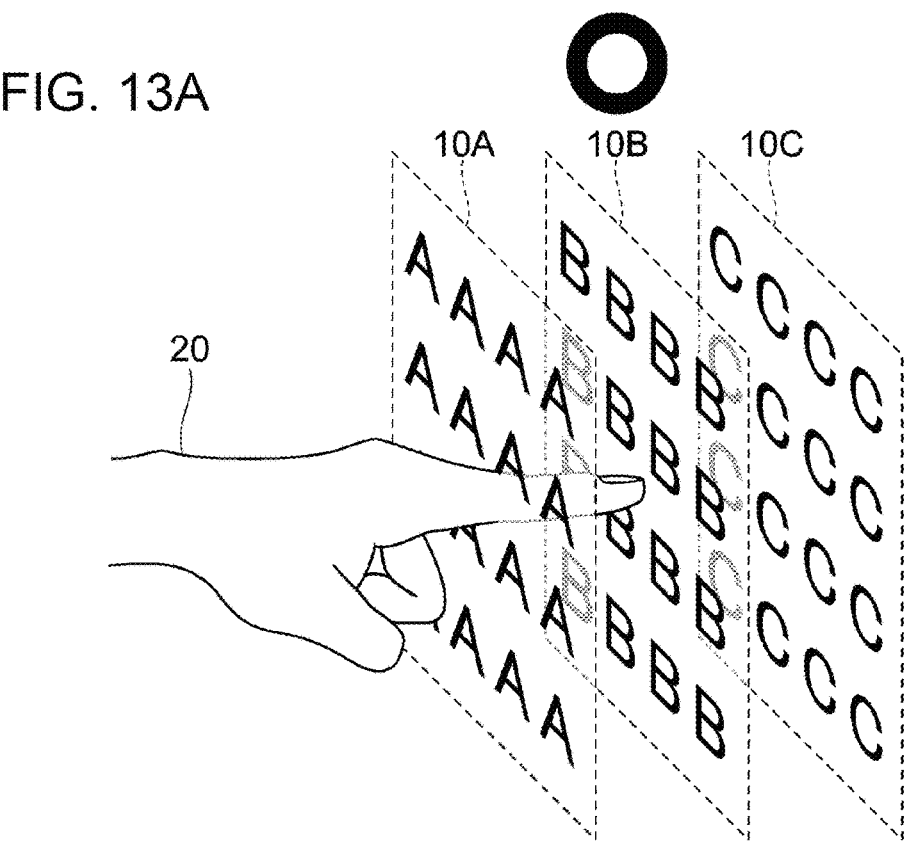
FIGS. 13A and 13B illustrate another control example where a finger inserted in the depth direction through an aerial image located at the front side overlaps a second aerial image, FIG. 13A illustrating a state where the finger is inserted from the front side, FIG. 13B illustrating an example where images have been shifted.
Figure 13B:
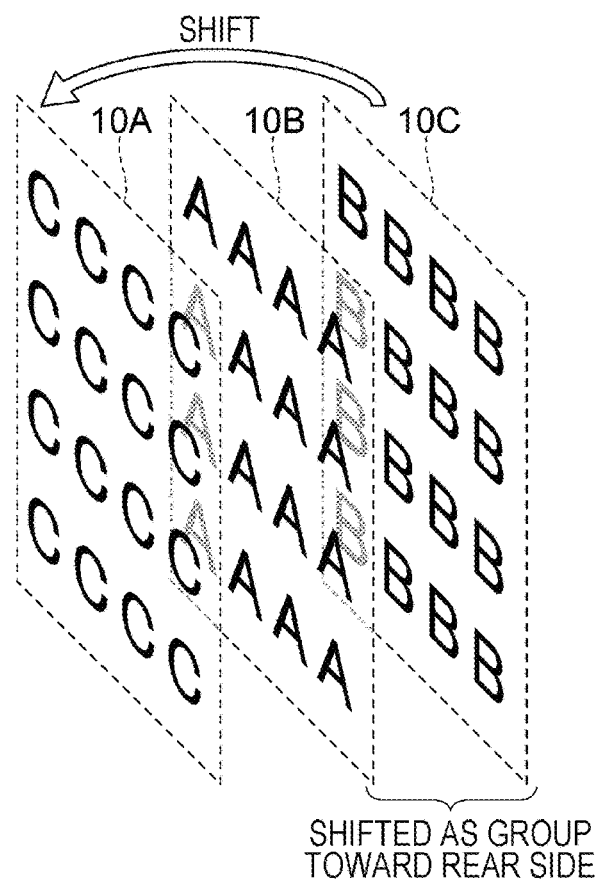

FIGS. 13A and 13B illustrate another control example where a finger inserted in the depth direction through the aerial image 10A located at the front side overlaps the second aerial image 10B. Specifically, FIG. 13A illustrates a state where the finger is inserted from the front side, and FIG. 13B illustrates an example where images have been shifted.

The control example shown in FIGS. 13A and 13B indicates a rule that causes images located behind an aerial image specified as an operation target to be shifted one-by-one toward the front side so that an image displayed immediately behind the specified aerial image is located at the front-most side.

Therefore, in the example in FIGS. 13A and 13B, the content "CCCC/CCCC/CCCC/CCCC" displayed in the aerial image 10C located behind the aerial image 10B overlapping with the finger is located at the front-most side. In the case of this control example, the display contents of the aerial images 10A and 10B including the aerial image at the specified position and previously located at the front side are shifted together (as a group) toward the rear side.

In other words, the control example shown in FIGS. 13A and 13B corresponds to a rule that causes the display content of display including the specified position and located at the front side and the display content behind the specified position to be interchanged with each other.

Although the aerial images 10A and 10B are treated as a group in FIGS. 13A and 13B, multiple images (e.g., the aerial images 10A and 10C) that are not successive in the depth direction may be designated as a group and be shifted.

Second Control Example

The following description relates to a case where an operation of touching an outer edge of an aerial image formed in the air from outside the aerial image is performed so as to specify an aerial image as an operation target and changing the arranged order of display contents.

The arranged order is changed in accordance with a method similar to that in the first control example.

Figure 14:
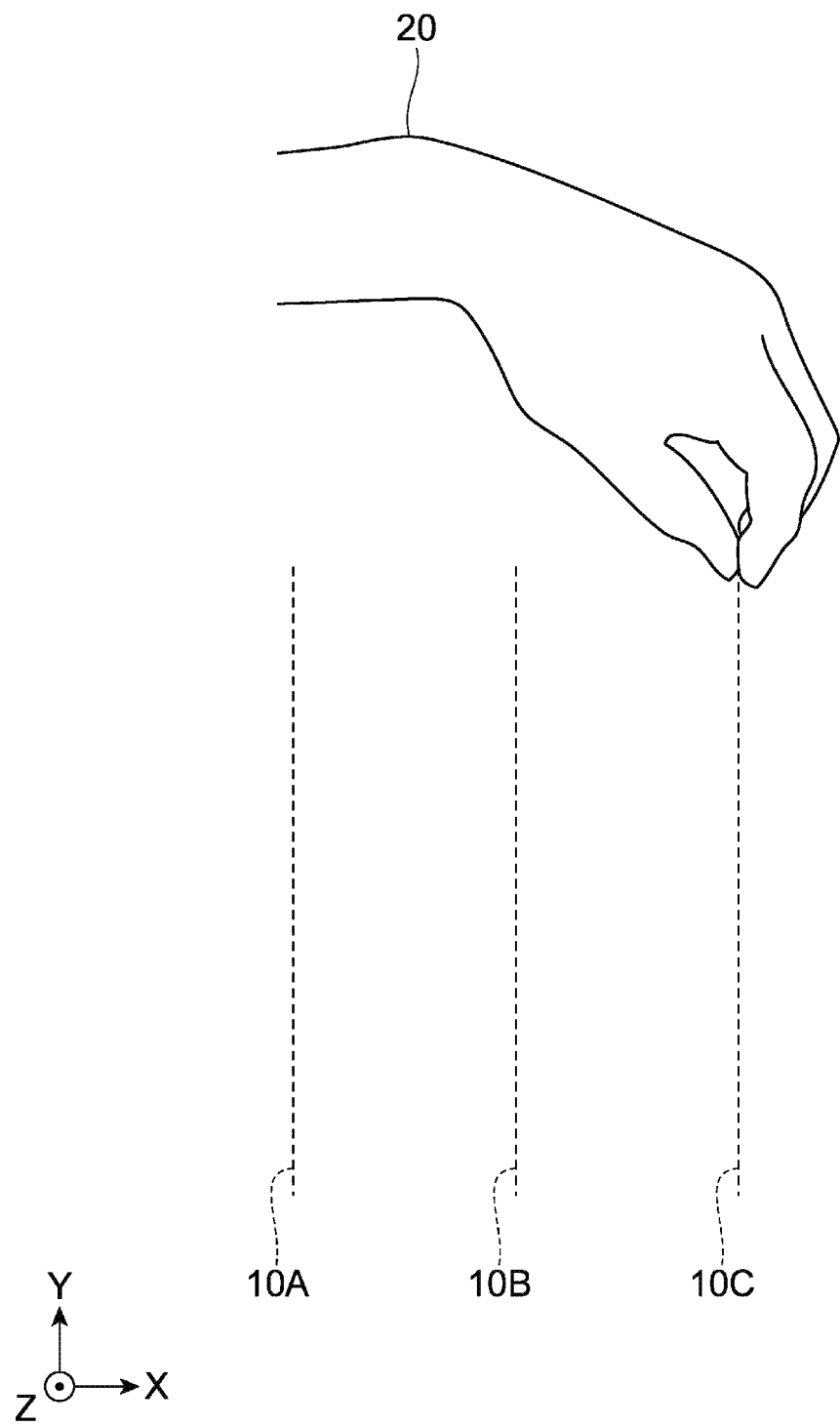
FIG. 14 illustrates a control example where a gesture of using fingers to pinch an outer edge of an aerial image as an operation target from outside the space in which aerial images are formed is used.

FIG. 14 illustrates a control example where a gesture of using fingers to pinch the outer edge of the aerial image 10C as an operation target from outside the space in which the aerial images 10A to 10C are formed is used. Although the term "pinch" is used, since the aerial images 10 do not exist in actuality, it is not actually possible to pinch a specific aerial image.

In this control example, an aerial image pinched with fingers is specified as an operation target. The operation after the pinching operation is similar to that in the first control example. The pinching operation is one mode of a gesture corresponding to an operation.

Figure 15:
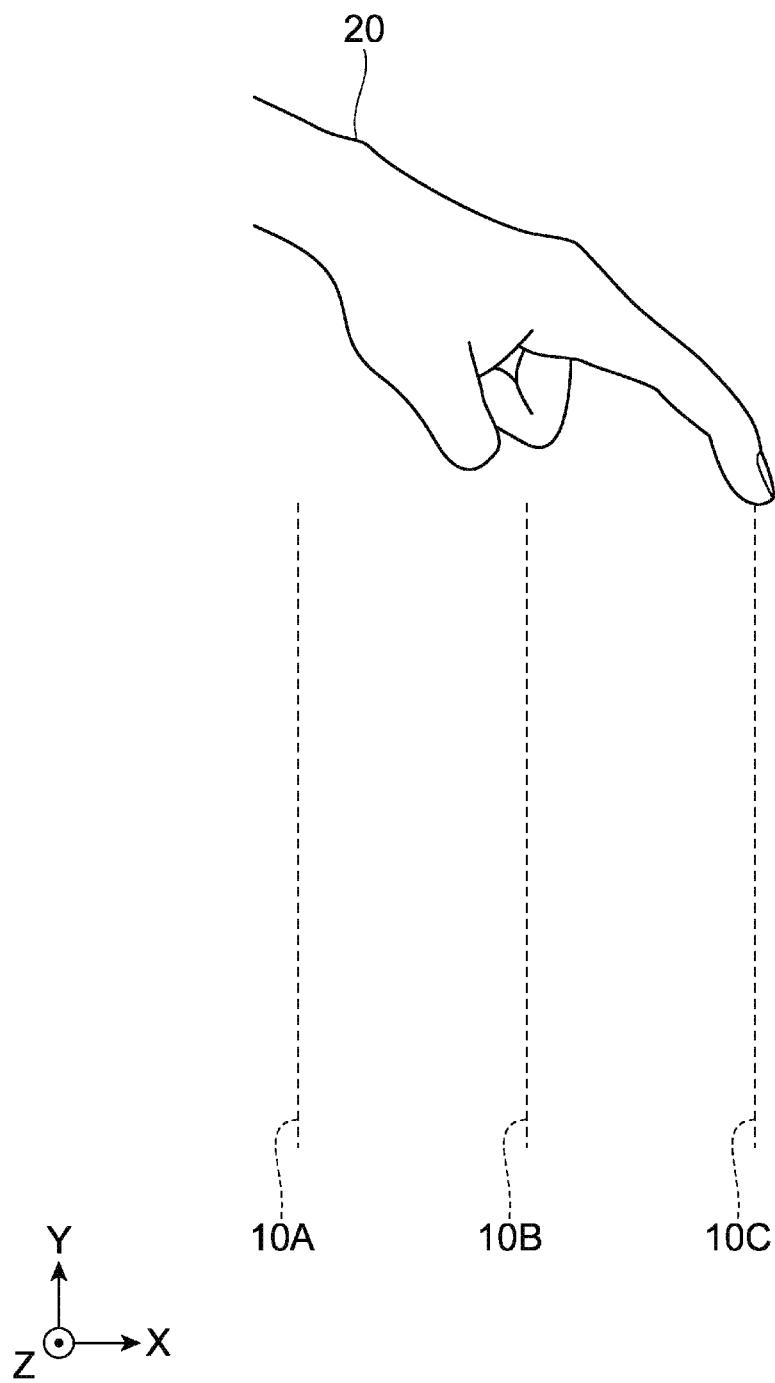
FIG. 15 illustrates a control example where a gesture of using fingers to touch an outer edge of an aerial image as an operation target from outside the space in which aerial images are formed is used.

FIG. 15 illustrates a control example where a gesture of using fingers to touch the outer edge of the aerial image 10C as an operation target from outside the space in which the aerial images 10A to 10C are formed is used. Although the term "touch" is used, since the aerial images 10A to 10C do not exist in actuality, it is not actually possible to touch the aerial image 10C. The touching operation is one mode of a gesture corresponding to an operation.

Figure 16:
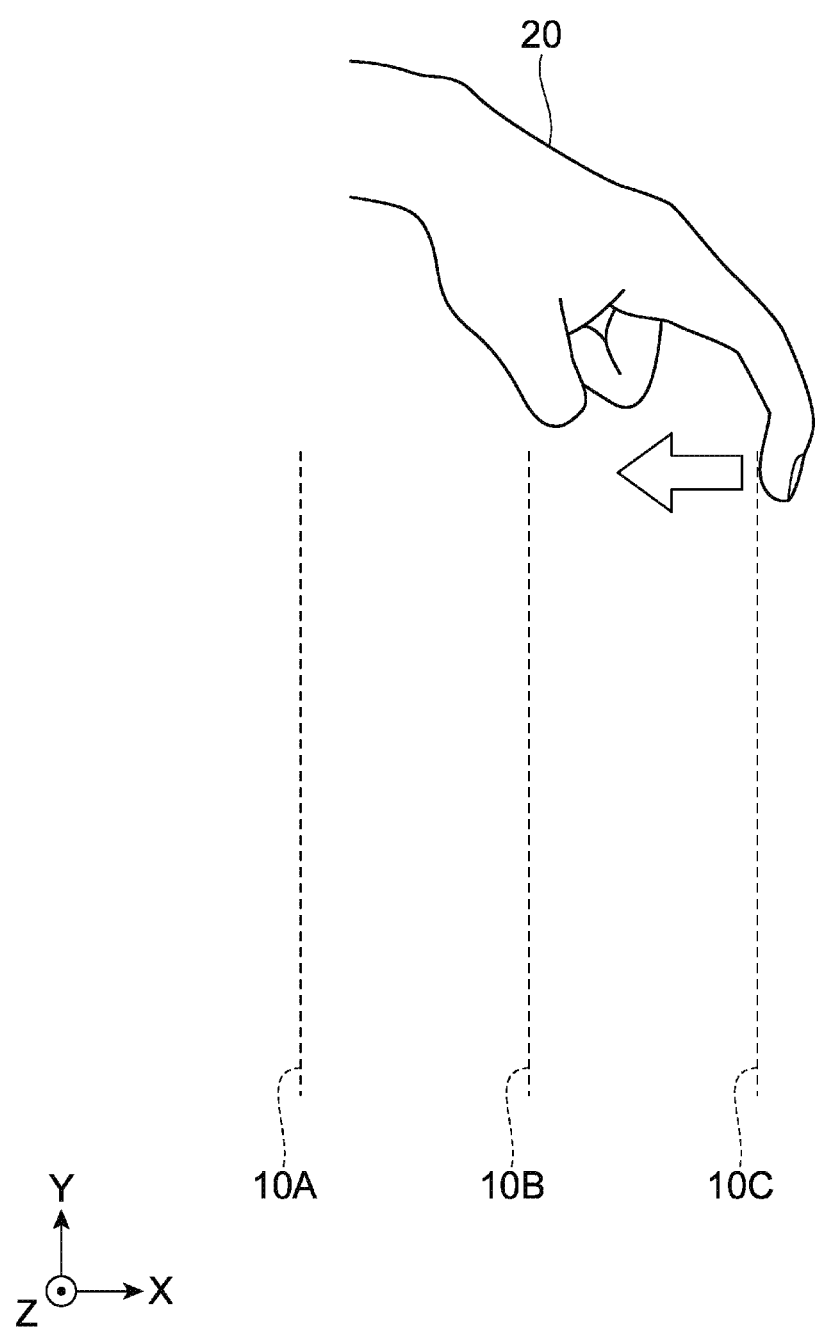
FIG. 16 illustrates a control example where the content of an operation performed on an aerial image as an operation target is indicated from outside the space in which aerial images are formed.

FIG. 16 illustrates a control example where the content of an operation performed on the aerial image 10C as an operation target is indicated from outside the space in which the aerial images 10A to 10C are formed. In the example in FIG. 16, a gesture of moving a finger toward the front side from the rear side of the aerial image 10C is performed.

This gesture is determined as an operation for shifting the content displayed in the aerial image 10C toward the front side. In accordance with this gesture, the content displayed in the aerial image 10C is shifted, for example, to the second position from the front side. Alternatively, in accordance with this gesture, the content displayed in the aerial image 10C may be shifted to the first position from the front side. The finger motion in this case is one mode of a gesture corresponding to an operation.

Third Control Example

The following description relates to another example where an aerial image as an operation target is specified and the arranged order of the display contents is changed in accordance with a gesture performed on aerial images formed in the air.

Figure 17:
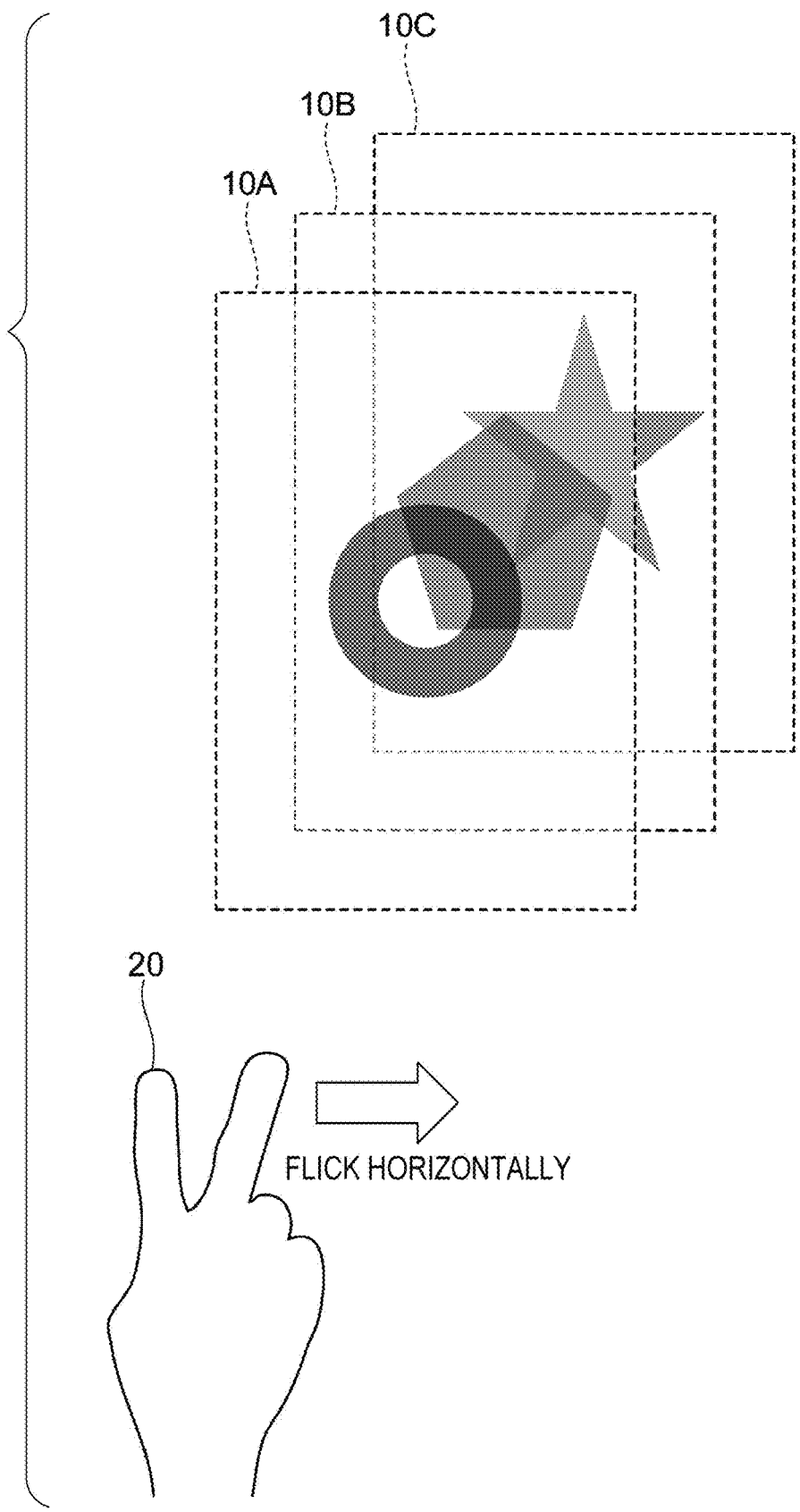
FIG. 17 illustrates a control example where an aerial image as an operation target is specified and the content of an operation is indicated in accordance with a gesture.

FIG. 17 illustrates a control example where the aerial image 10B as an operation target is specified and the content of an operation is indicated in accordance with a gesture.

In FIG. 17, a ring-shaped figure is displayed in the aerial image 10A, a pentagonal figure is displayed in the aerial image 10B, and a star-shaped figure is displayed in the aerial image 10C.

In the case of FIG. 17, the person 20 moves a V shape formed with the index and middle fingers in a flicking manner in the horizontal direction (i.e., a direction parallel to the display face). The V shape in this case specifies that the second aerial image 10B from the front side is the operation target. The gesture of flicking the V shape in the horizontal direction indicates that the aerial image 10B as an operation target is to be deleted from the display.

Figure 18:
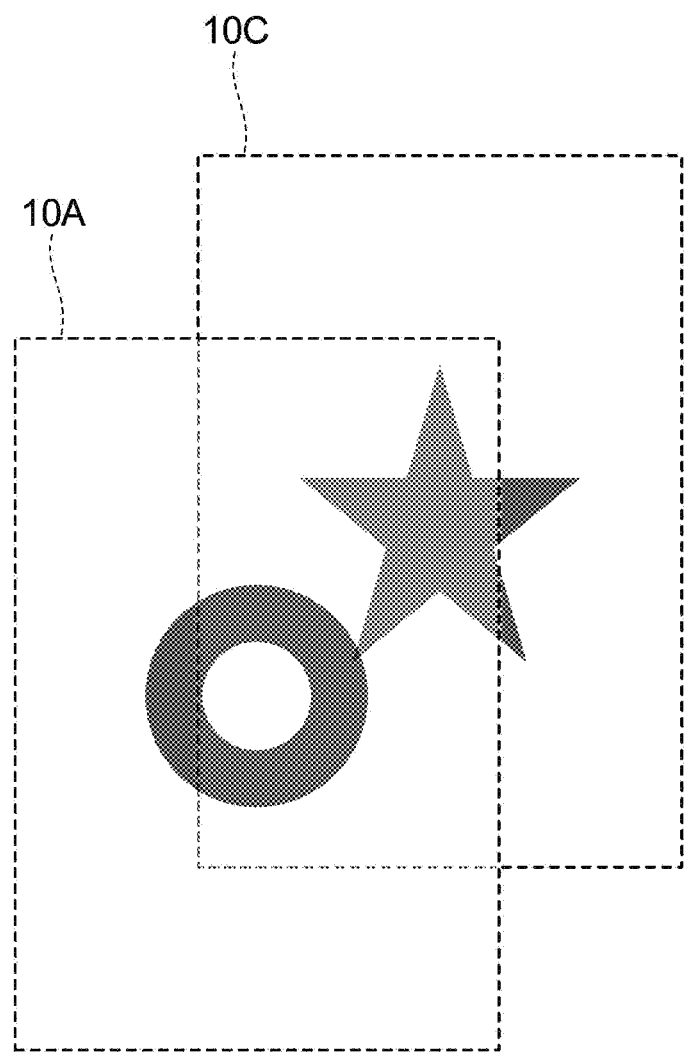
FIG. 18 illustrates a result of deleting a second aerial image from the display.

FIG. 18 illustrates a result of deleting the second aerial image 10B from the display. As a result of the operation, the aerial image 10A and the aerial image 10C remain, whereas the aerial image 10B has been removed.

In a case where the first aerial image 10A from the front side is to be specified as the operation target, for example, the index finger may be set in the erected state. In a case where the third aerial image 10C from the front side is to be specified as the operation target, for example, three fingers may be set in the erected state.

Figure 19:
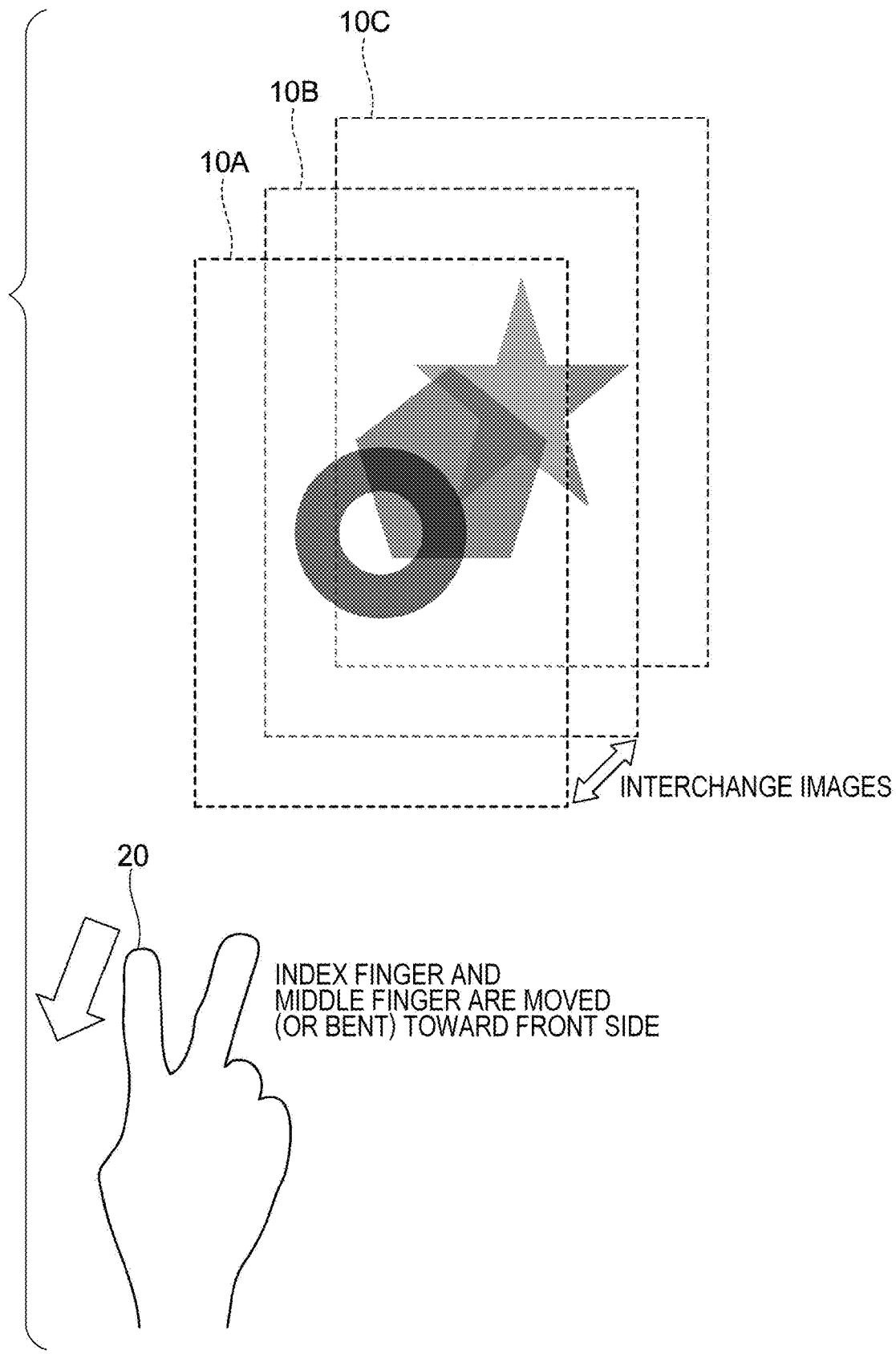
FIG. 19 illustrates another control example where an aerial image as an operation target is specified and the content of an operation is indicated in accordance with a gesture.

FIG. 19 illustrates another control example where the aerial image 10B as an operation target is specified and the content of an operation is indicated in accordance with a gesture.

Similar to the above control example, a ring-shaped figure is displayed in the aerial image 10A, a pentagonal figure is displayed in the aerial image 10B, and a star-shaped figure is displayed in the aerial image 10C.

In the case of FIG. 19, the person 20 moves or bends a V shape formed with the index and middle fingers toward the front side. The gesture of moving or bending the V shape toward the front side indicates that the aerial image 10B as an operation target is to be shifted toward the front side.

Similar to the case of FIGS. 11A and 11B, FIG. 19 illustrates an example where the first aerial image 10A from the front side and the second aerial image 10B from the front side are interchanged with each other. In this case, the pentagonal figure is displayed in the first aerial image 10A from the front side, the ring-shaped figure is displayed in the second aerial image 10B, and the star-shaped figure is displayed in the third aerial image 10C.

An effect occurring in response to an operation is dependent on a predetermined rule. Therefore, as shown in FIGS. 12A and 12B, the figure displayed in front of the aerial image 10B as an operation target may be shifted to the rear side of the other aerial images 10A and 10C. In this case, the pentagonal figure is displayed in the first aerial image 10A from the front side, the star-shaped figure is displayed in the second aerial image 10B, and the ring-shaped figure is displayed in the third aerial image 10C.

Examples of the gesture include pushing or flicking toward the rear side (i.e., shifting the content displayed in the target aerial image toward the rear side) and turning (i.e., shifting the previous or subsequent page toward the front side relative to the page corresponding to the target aerial image).

Fourth Control Example

The following description relates to a case where an aerial image as an operation target is specified and the arranged order of the display contents is changed in accordance with a voice.

Figure 20A:
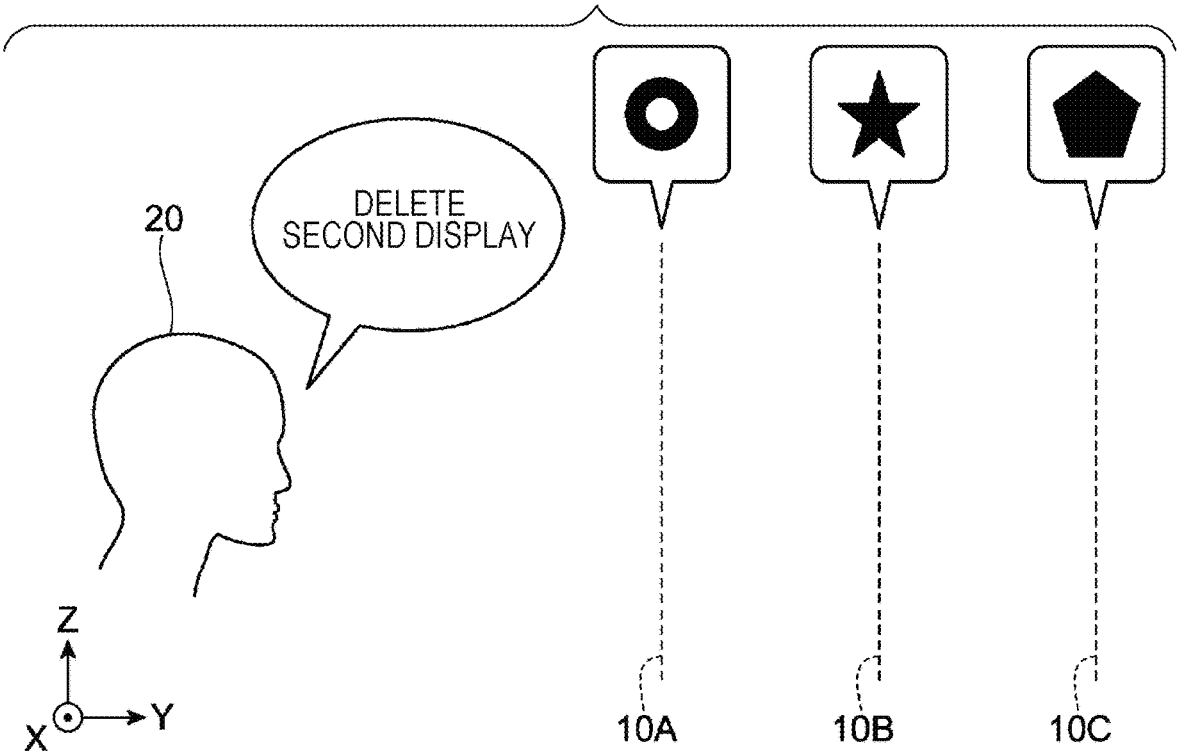
FIGS. 20A and 20B illustrate a control example where an aerial image as an operation target is specified and the content of an operation is indicated in accordance with a voice, FIG. 20A illustrating an operation command made based on a voice, FIG. 20B illustrating a result of the operation.
Figure 20B:
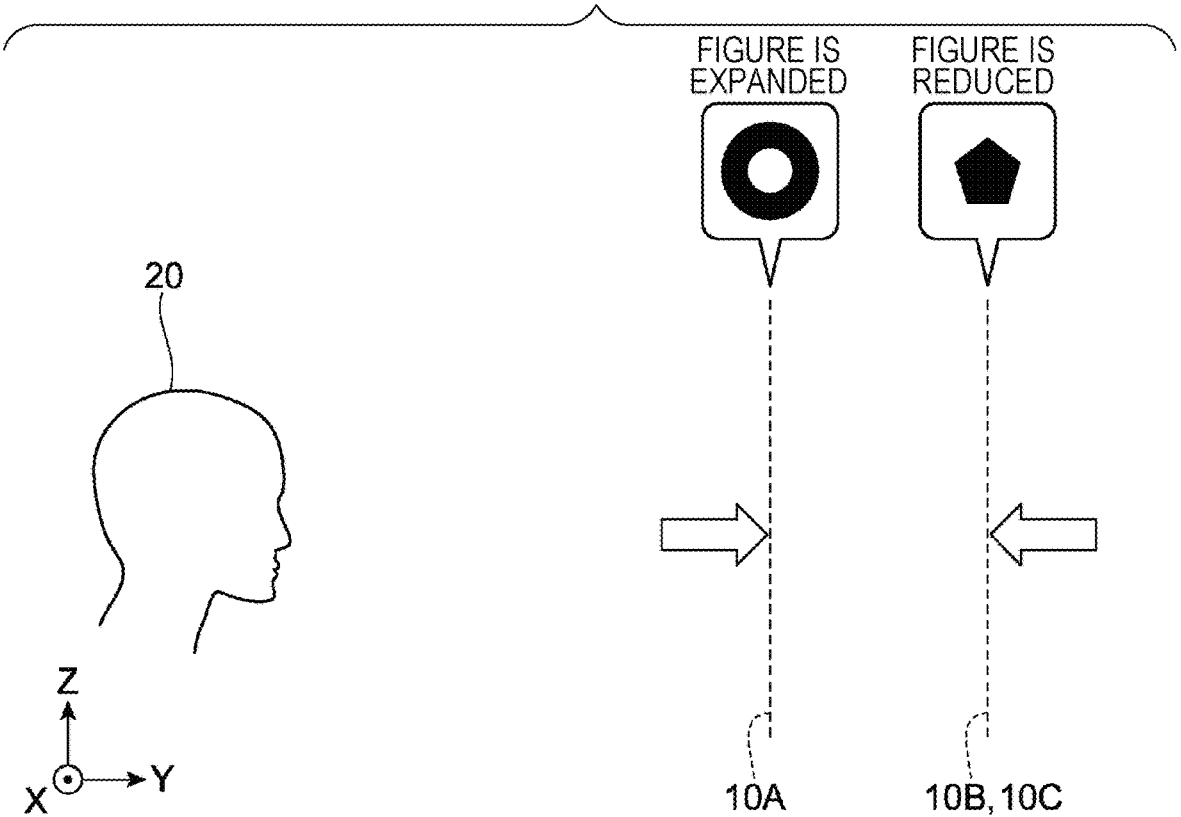

FIGS. 20A and 20B illustrate a control example where the aerial image 10B as an operation target is specified and the content of an operation is indicated in accordance with a voice. Specifically, FIG. 20A illustrates an operation command made based on a voice, and FIG. 20B illustrates a result of the operation.

In the case of FIGS. 20A and 20B, a ring-shaped figure is displayed in the aerial image 10A, a star-shaped figure is displayed in the aerial image 10B, and a pentagonal figure is displayed in the aerial image 10C.

In FIGS. 20A and 20B, the content of the operation based on the voice indicates that the second aerial image 10B is the operation target and is to be deleted from the display.

In the example in FIGS. 20A and 20B, the star-shaped figure displayed in the aerial image 10B at the second position from the front side is removed. Thus, the positions where the aerial image 10A and the aerial image 10C are formed are changed such that the distance between the ring-shaped figure displayed in the aerial image 10A and the pentagonal figure displayed in the aerial image 10C does not increase. Specifically, the position where the aerial image 10A is formed is shifted toward the rear side, and the position where the aerial image 10C is formed is shifted toward the front side. This shifting is one mode of positional adjustment.

However, simply shifting the positions where the aerial image 10A and the aerial image 10C are formed may change how the ring-shaped figure displayed in the aerial image 10A appears (such as the size thereof), possibly bringing discomfort to the person 20. Specifically, the position where the aerial image 10A is formed is shifted away from the person 20, as compared with the position prior to the operation, possibly causing the ring-shaped figure to appear smaller.

In a case where there is a change in the position of the aerial image 10A, which is located at the front-most side and is an image of interest to the person 20, the content displayed in the aerial image 10A or the size of the aerial image 10A may be expanded so as not to bring discomfort to the person 20. For example, in a case where the display content includes text, the font size is increased. For example, in a case where the display content includes a figure, the size of the figure is increased.

Therefore, in FIGS. 20A and 20B, the size of the figure displayed in the aerial image 10A is increased with increasing distance from the person 20. In contrast, in FIGS. 20A and 20B, the size of the figure displayed in the aerial image 10C is decreased with decreasing distance to the person 20.

The expansion and reduction of the display content are for avoiding visual discomfort. Thus, the display content does not have to be expanded or reduced if such discomfort is to be neglected or if there is only a small degree of discomfort (e.g., if the shift distance is smaller than a predetermined threshold value).

If the number of aerial images to be displayed decreases, the aerial-image forming device used for forming the aerial image deleted from the display becomes unoccupied. Thus, in FIGS. 20A and 20B, the aerial image 10B or 10C corresponding to the aerial-image forming device 32 (see FIG. 1) or the aerial-image forming device 33 (see FIG. 1) is used for displaying the pentagonal figure.

Figure 21A:
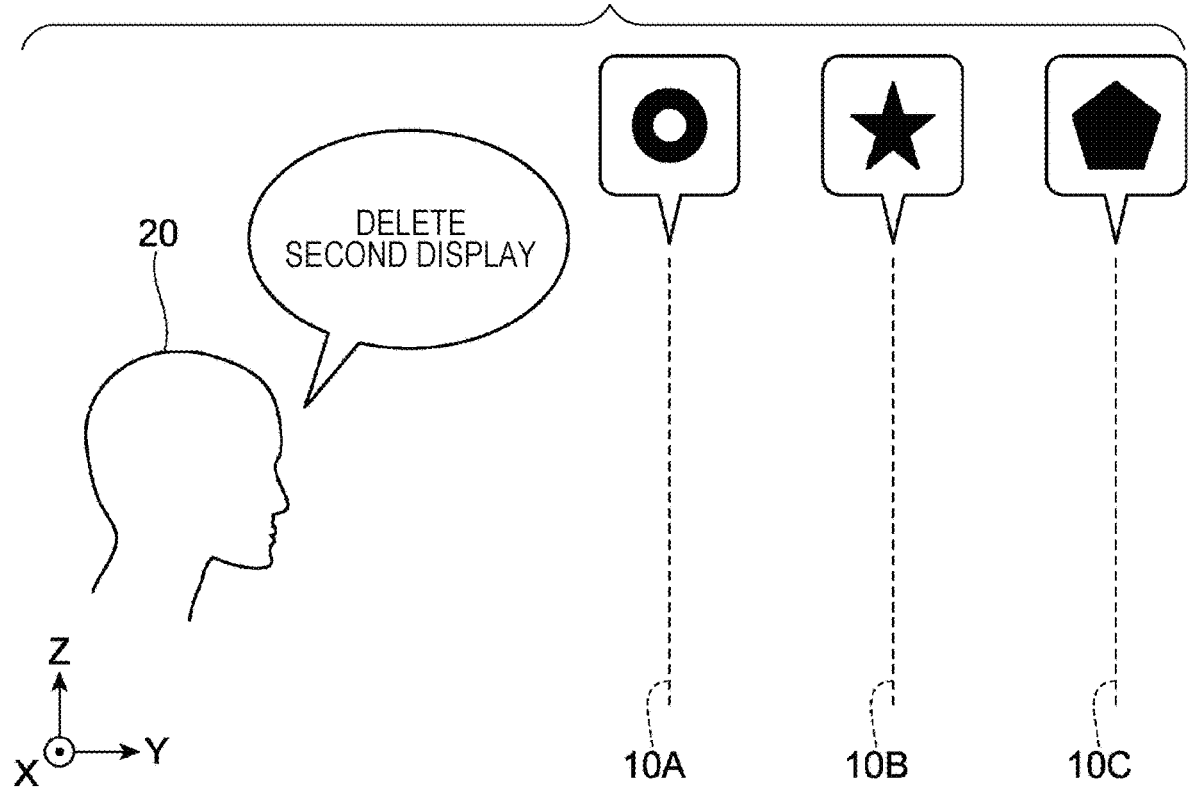
FIGS. 21A and 21B illustrate another control example where an aerial image as an operation target is specified and the content of an operation is indicated in accordance with a voice, FIG. 21A illustrating an operation command made based on a voice, FIG. 21B illustrating a result of the operation.
Figure 21B:
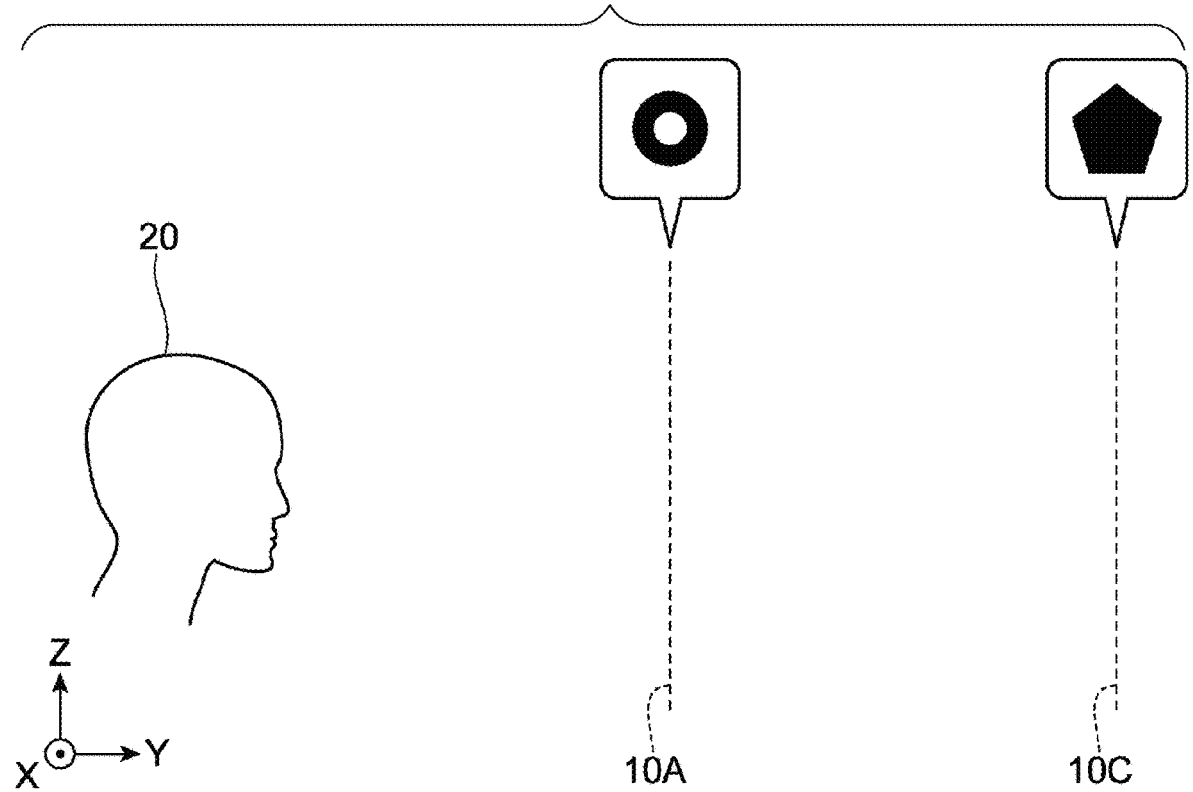

FIGS. 21A and 21B illustrate another control example where the aerial image 10B as an operation target is specified and the content of an operation is indicated in accordance with a voice. Specifically, FIG. 21A illustrates an operation command made based on a voice, and FIG. 21B illustrates a result of the operation.

In the case of FIGS. 21A and 21B, the second aerial image 10B is simply deleted from the display.

Figure 22A:
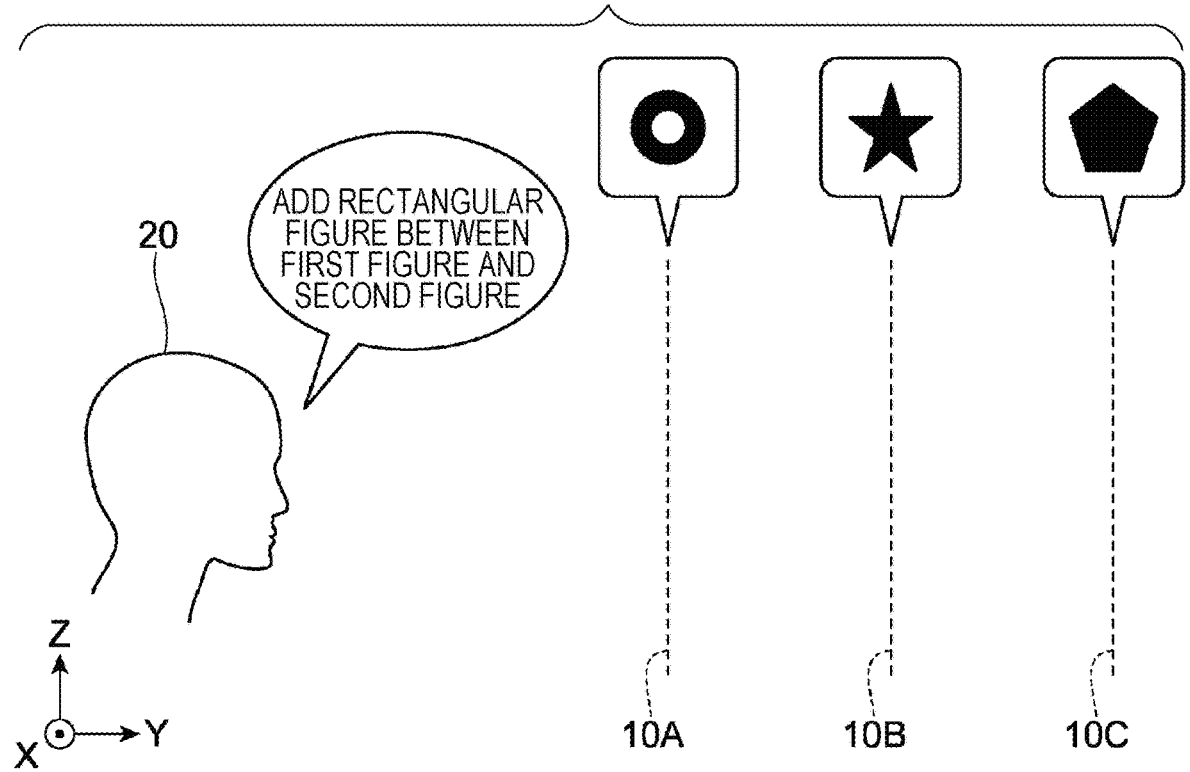
FIGS. 22A and 22B illustrate another control example where an aerial image as an operation target is specified and the content of an operation is indicated in accordance with a voice, FIG. 22A illustrating an operation command made based on a voice, FIG. 22B illustrating a result of the operation.
Figure 22B:
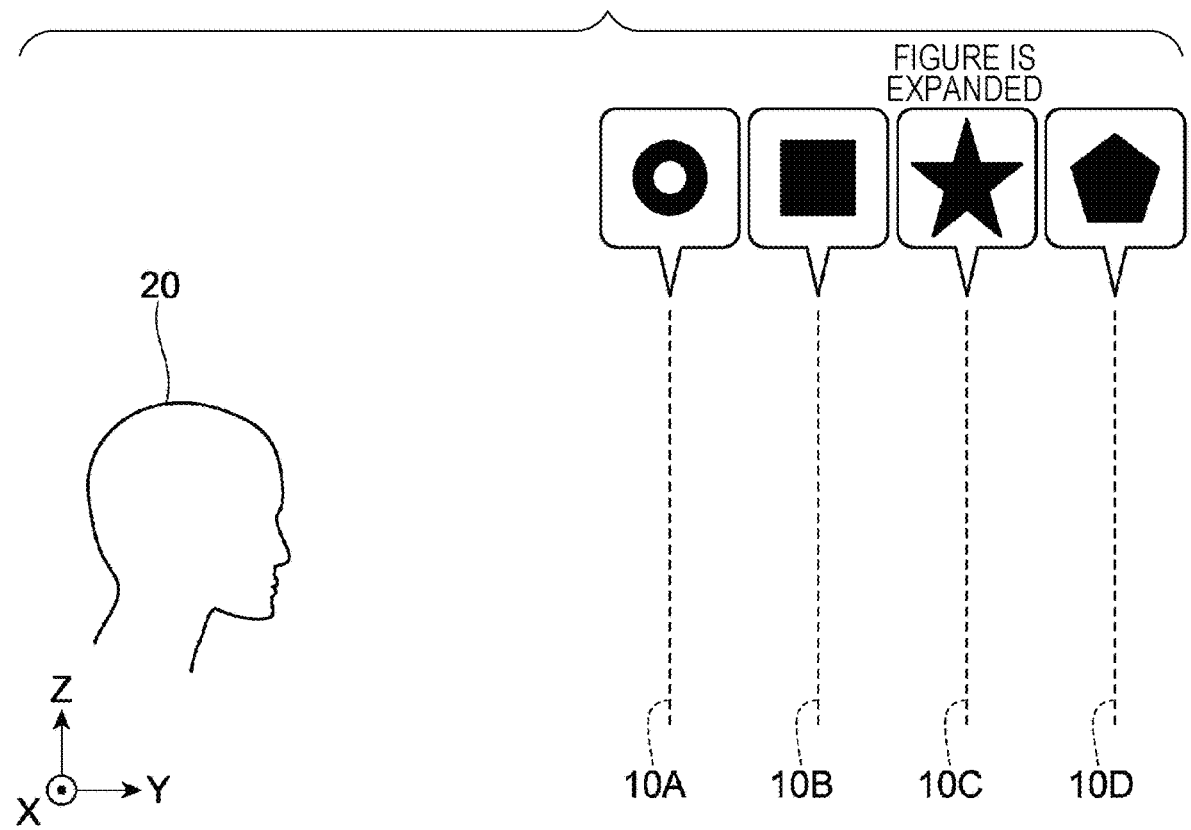

FIGS. 22A and 22B illustrate another control example where the aerial image 10B as an operation target is specified and the content of an operation is indicated in accordance with a voice. Specifically, FIG. 22A illustrates an operation command made based on a voice, and FIG. 22B illustrates a result of the operation.

Unlike FIGS. 20A and 20B and FIGS. 21A and 21B, the example in FIGS. 22A and 22B indicates a case where a figure is added (or inserted). Specifically, there is a command for adding a rectangular figure between the first and second figures. In FIGS. 22A and 22B, control is performed such that four aerial images 10A, 10B, 10C, and 10D are separated from each other by substantially equal gaps.

In the example in FIGS. 22A and 22B, it is assumed that a fourth aerial-image forming device capable of forming the aerial image 10D is prepared.

In the example in FIGS. 22A and 22B, the position where the star-shaped figure is displayed is shifted in the depth direction as result of the addition of the new aerial image (i.e., rectangular figure). Thus, the size of the star-shaped figure is increased from the size thereof prior to the shifting. In contrast, the figure whose display position is shifted toward the front side is reduced in size as a result of the addition of the new aerial image.

Display Example of Aerial Images for Enhancing Visibility

The following description relates to how an aerial image 10A located at the front side is displayed with increased visibility in a case where the display faces of multiple aerial images 10A to 10C are arranged in an overlapping manner.

Figures 23A, 23B:
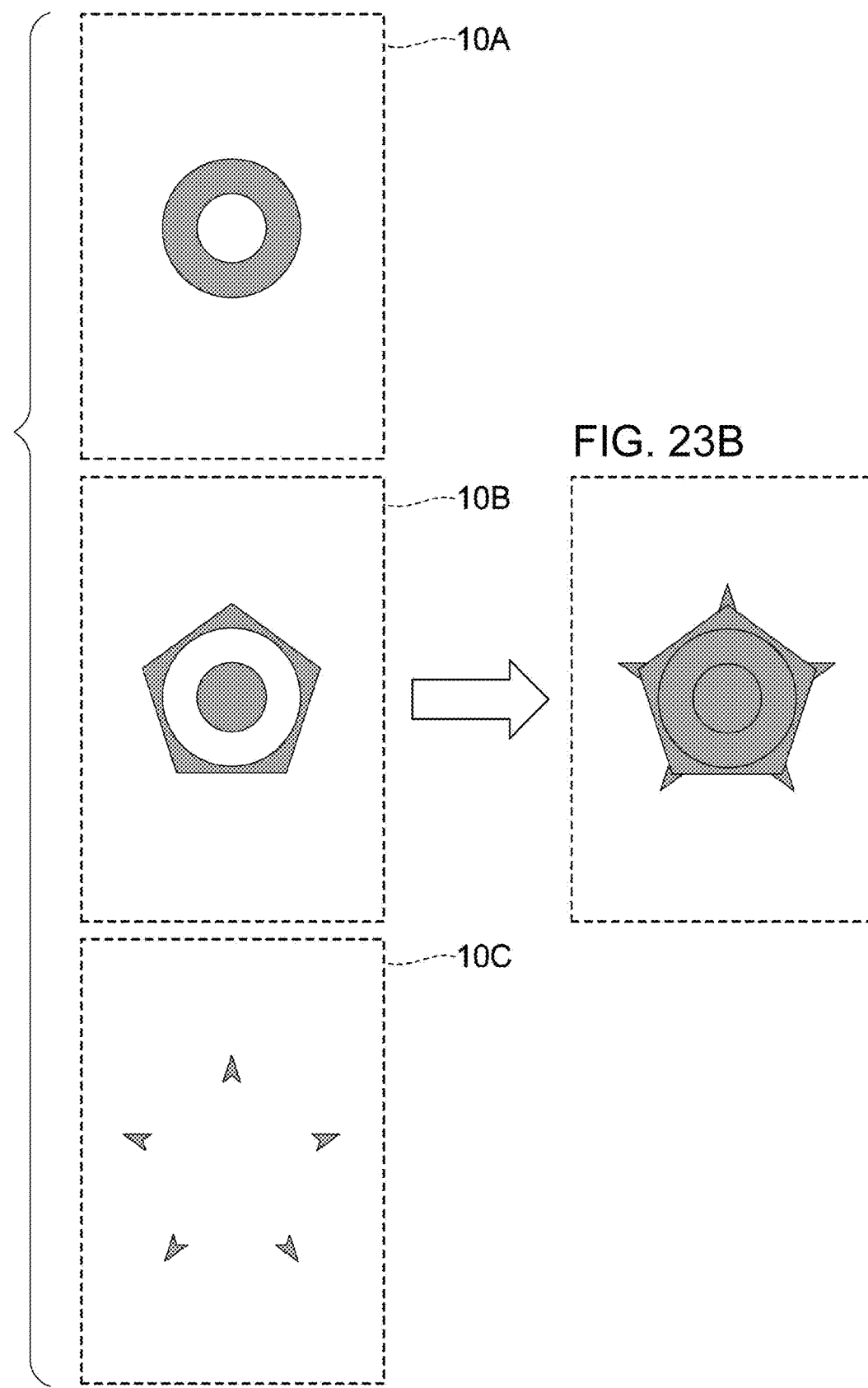
FIGS. 23A and 23B illustrate how a section of an aerial image at the rear side that overlaps with the content displayed at the front side is voided (or excluded from the display), FIG. 23A illustrating the display contents of aerial images, FIG. 23B illustrating how the display contents are viewed from a person.

FIGS. 23A and 23B illustrate how a section of an aerial image at the rear side that overlaps with the content displayed at the front side is voided (or excluded from the display). Specifically, FIG. 23A illustrates the display contents of the aerial images 10A to 10C, and FIG. 23B illustrates how the display contents are viewed from a person.

The display shown in FIGS. 23A and 23B corresponds to a case where the aerial images 10A, 10B, and 10C are formed in that order from the front side as viewed from the person, as shown in FIG. 1.

In this case, a ring-shaped figure is displayed in the aerial image 10A, a pentagonal figure is displayed in the aerial image 10B, and a star-shaped figure is displayed in the aerial image 10C.

In a case where the aerial images 10B and 10C located at the rear side are viewed through the aerial image 10A (e.g., see FIG. 17), the visibility decreases at a section that overlaps with the contents displayed in the aerial images 10B and 10C located at the rear side (i.e., the pentagonal figure and the star-shaped figure).

In the example shown in FIGS. 23A and 23B, the pentagonal figure displayed in the second aerial image 10B is processed such that a section thereof that overlaps with the ring-shaped figure displayed in the first aerial image 10A is voided. The star-shaped figure displayed in the third aerial image 10C is processed such that a section thereof that overlaps with the ring-shaped figure displayed in the first aerial image 10A and the pentagonal figure displayed in the second aerial image 10B is voided. In the example shown in FIGS. 23A and 23B, only the ends of the star are displayed.

The overlapping sections are voided among the multiple aerial images in this manner so that the front side is prioritized, whereby the visibility of the display content in each layer is improved.

Figure 24A:
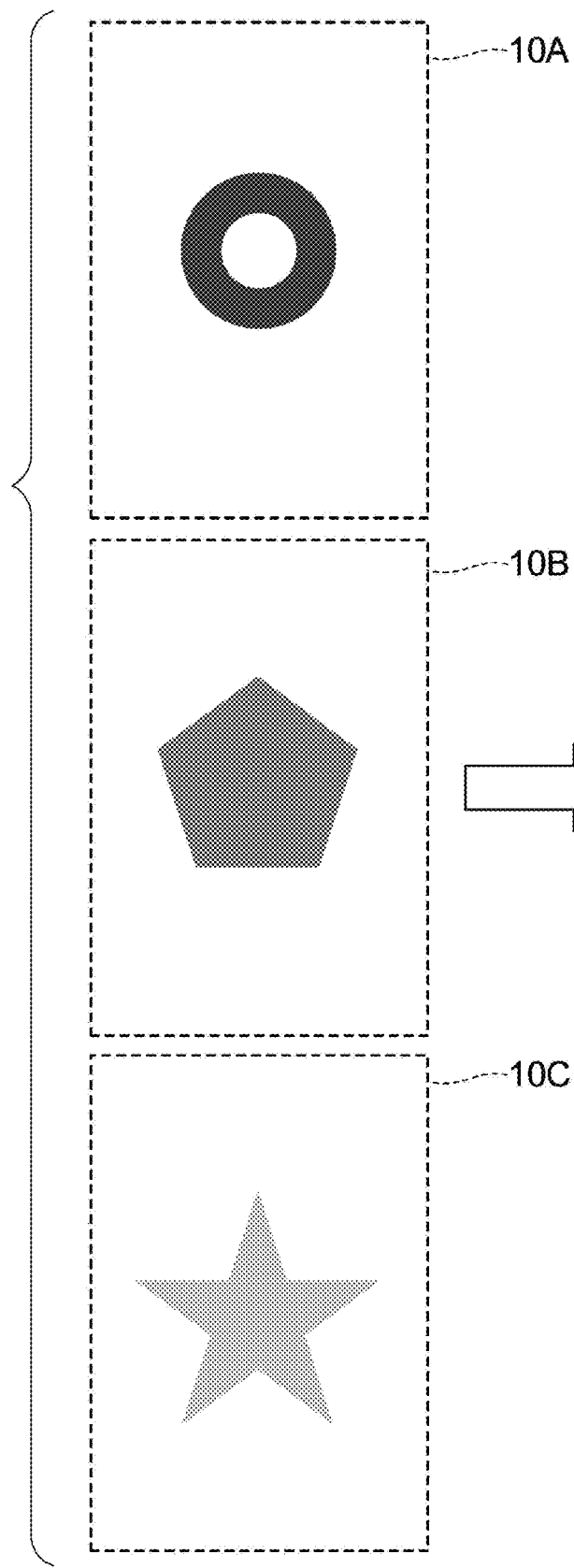
FIGS. 24A and 24B illustrate another method for enhancing the visibility of the display content of an aerial image at the front side, FIG. 24A illustrating the display contents of aerial images, FIG. 24B illustrating how the display contents are viewed from a person.
Figure 24B:
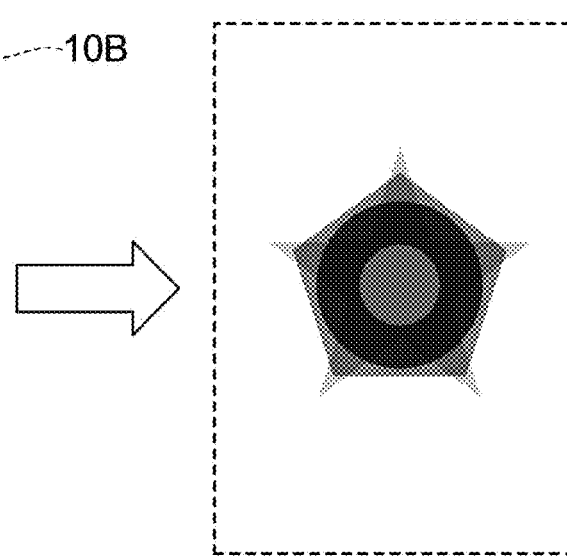

FIGS. 24A and 24B illustrate another method for enhancing the visibility of the display content of an aerial image at the front side. Specifically, FIG. 24A illustrates the display contents of the aerial images 10A to 10C, and FIG. 24B illustrates how the display contents are viewed from a person.

In this case, the brightness used for displaying the aerial images is increased toward the front side, while the display contents remain the same. In other words, the brightness used for displaying the aerial images is decreased toward the rear side.

Needless to say, the visibility of the display contents increases with increasing brightness.

Second Exemplary Embodiment

Schematic Configuration of Aerial-Image Forming System

Figure 25:
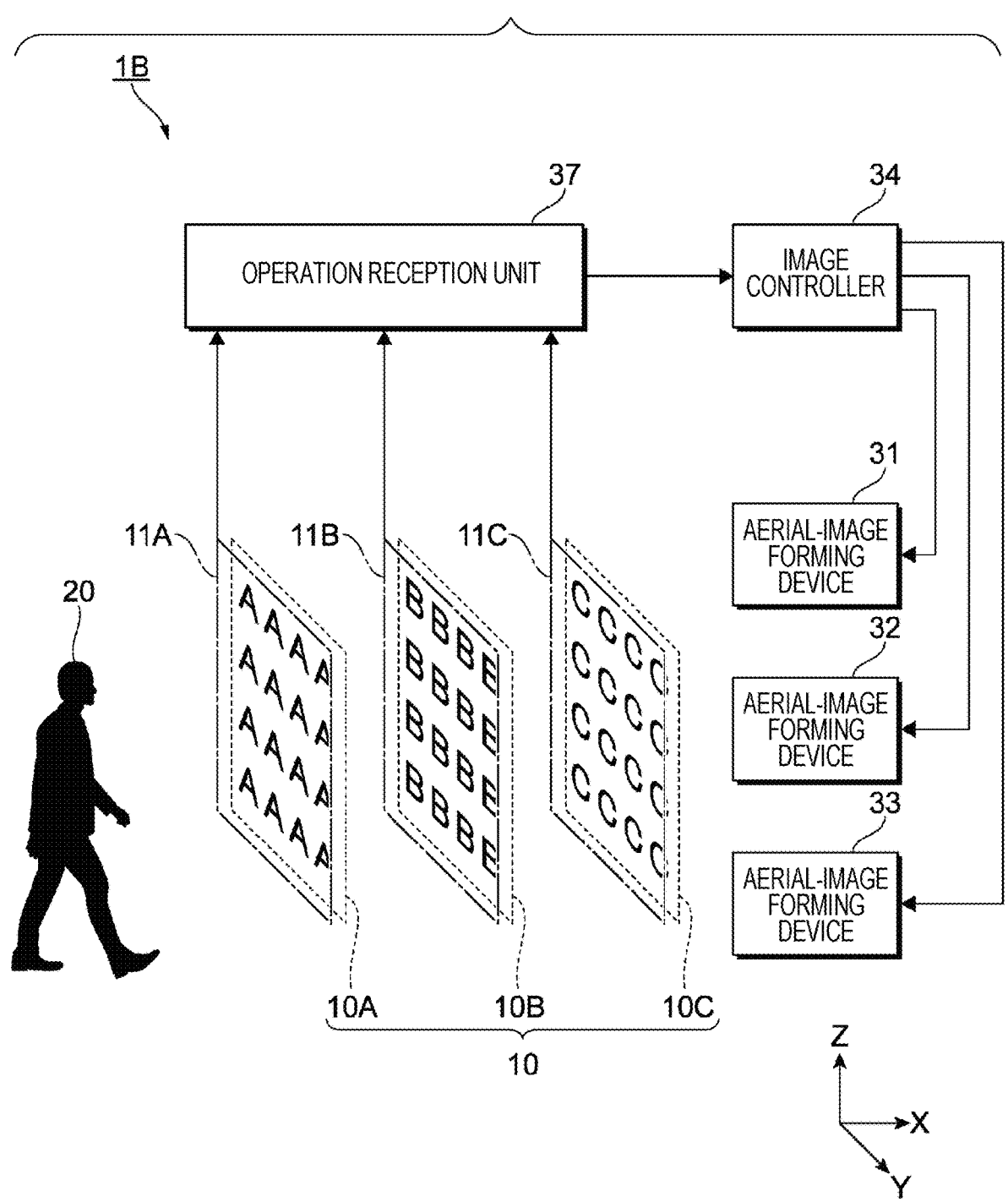
FIG. 25 schematically illustrates the configuration of an aerial-image forming system according to a second exemplary embodiment.

FIG. 25 schematically illustrates the configuration of an aerial-image forming system 1B according to a second exemplary embodiment. The aerial-image forming system 1B is an example of an information processing system.

In FIG. 25, components corresponding to those in FIG. 1 are given the corresponding reference signs. FIG. 25 is different from FIG. 1 in that, when an operation performed on the aerial image 10A, 10B, or 10C is to be detected, an optical detection plane 11A, 11B, or 11C is used, and in that an operation reception unit 37 that detects an object passing through the detection plane 11A, 11B, or 11C in a noncontact manner is provided.

The detection planes 11A, 11B, and 11C are each formed of light having a wavelength not viewable by man (e.g., infrared light). Each of the detection planes 11A, 11B, and 11C may also be used as a detection plane used for detecting the coordinates of an operated position.

In the case of this exemplary embodiment, the detection planes 11A, 11B, and 11C are flat and are disposed parallel to the aerial images 10A, 10B, and 10C. The detection planes 11A, 11B, and 11C are disposed away from the corresponding aerial images 10A, 10B, and 10C by a predetermined distance.

The operation reception unit 37 includes a light source that emits infrared light that forms the detection planes 11A, 11B, and 11C and a light receiving element that detects an object passing through the detection planes 11A, 11B, and 11C by receiving reflection light of the infrared light emitted from the light source.

In this exemplary embodiment, the detection planes 11A, 11B, and 11C each have an area larger than those of the corresponding aerial images 10A, 10B, and 10C. Alternatively, the detection planes 11A, 11B, and 11C may each have an area smaller than those of the aerial images 10A, 10B, and 10C so long as the area includes a region that displays buttons that receive an operation.

In the case of this exemplary embodiment, the detection planes 11A, 11B, and 11C are formed at the side where the front faces of the aerial images 10A, 10B, and 10C are displayed.

In a case where the aerial images 10A, 10B, and 10C are to shift within a space (e.g., FIGS. 20A and 20B and FIGS. 22A and 22B), the detection planes 11A, 11B, and 11C also shift in conjunction therewith. In this case, a shifting mechanism (not shown) is used for the shifting. The shifting mechanism (not shown) shifts the light source for the infrared light forming the detection planes 11A, 11B, and 11C and also shifts the infrared-light receiving element.

Figure 26:
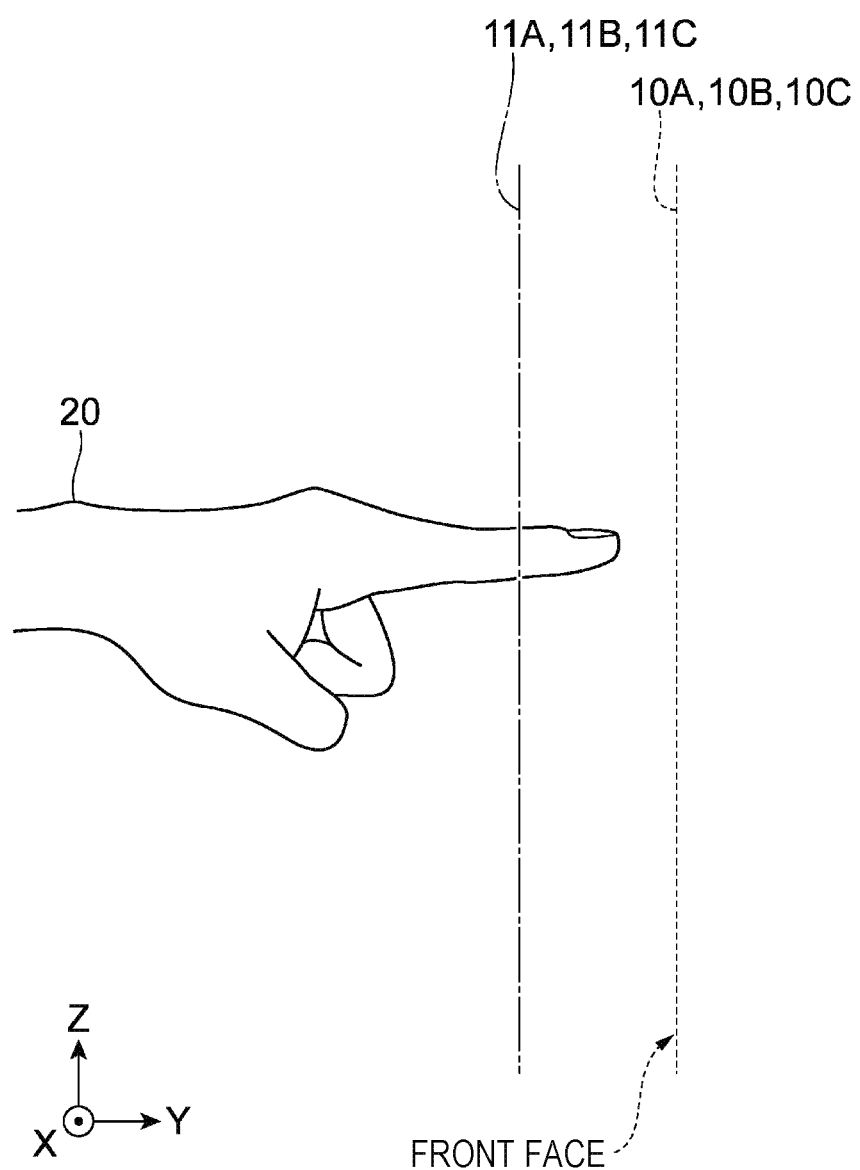
FIG. 26 illustrates the positional relationship between the front face of an aerial image and a detection plane.

FIG. 26 illustrates the positional relationship between the front face of the aerial image 10A (10B, 10C) and the detection plane 11A (11B, 11C). Although a finger of the person 20 is passed through the detection plane 11A (11B, 11C) in FIG. 26, a pointing stick or a writing tool may be passed through the detection plane 11A (11B, 11C).

Figure 27:
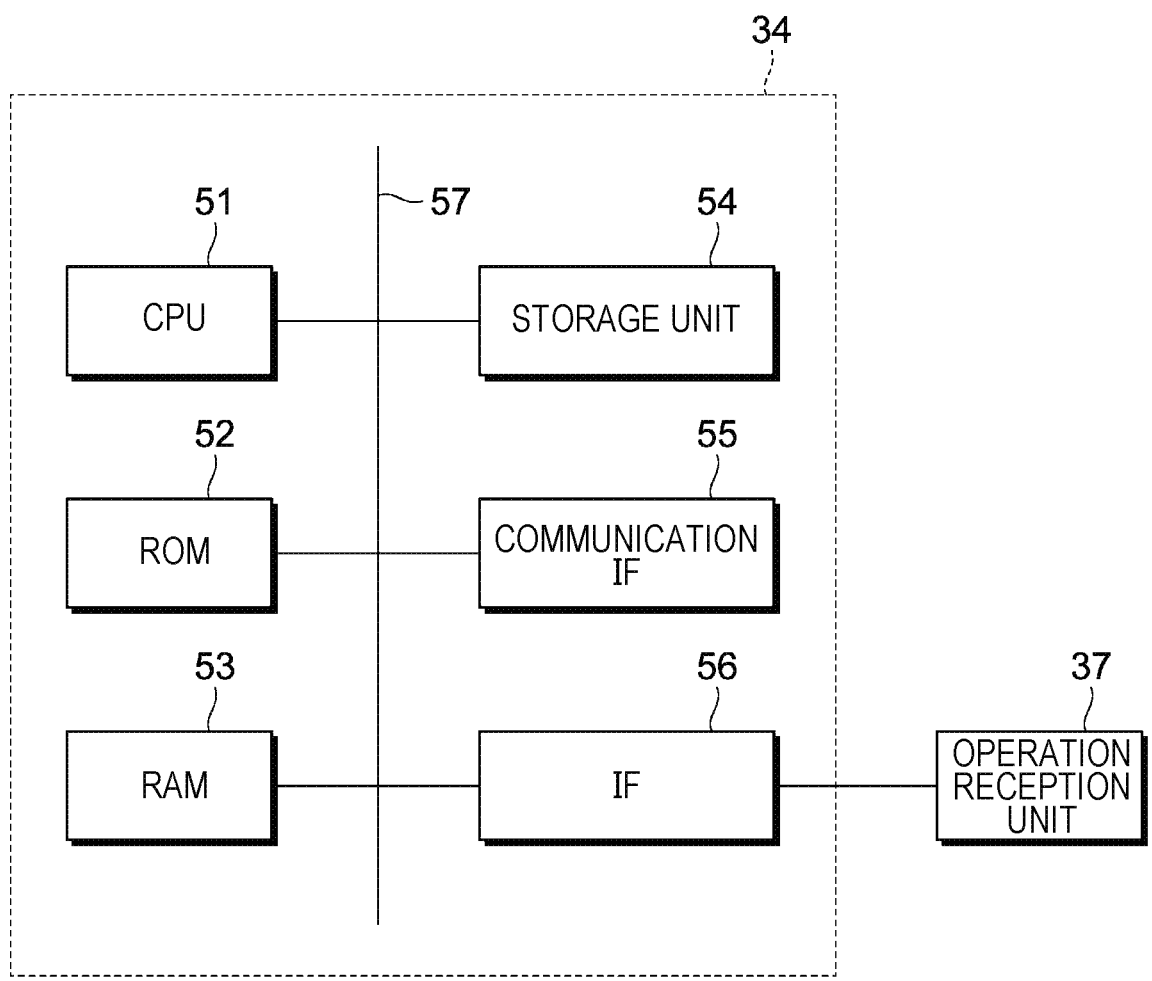
FIG. 27 illustrates an example of a hardware configuration of an image controller according to the second exemplary embodiment.

FIG. 27 illustrates an example of a hardware configuration of the image controller 34 according to the second exemplary embodiment.

In FIG. 27, components corresponding to those in FIG. 8 are given the corresponding reference signs.

The image controller 34 according to this exemplary embodiment is different from that in the first exemplary embodiment (see FIG. 8) in that the interface (IF) 56 is used to communicate with the operation reception unit 37.

Third Exemplary Embodiment

Schematic Configuration of Aerial-Image Forming System

Figure 28:
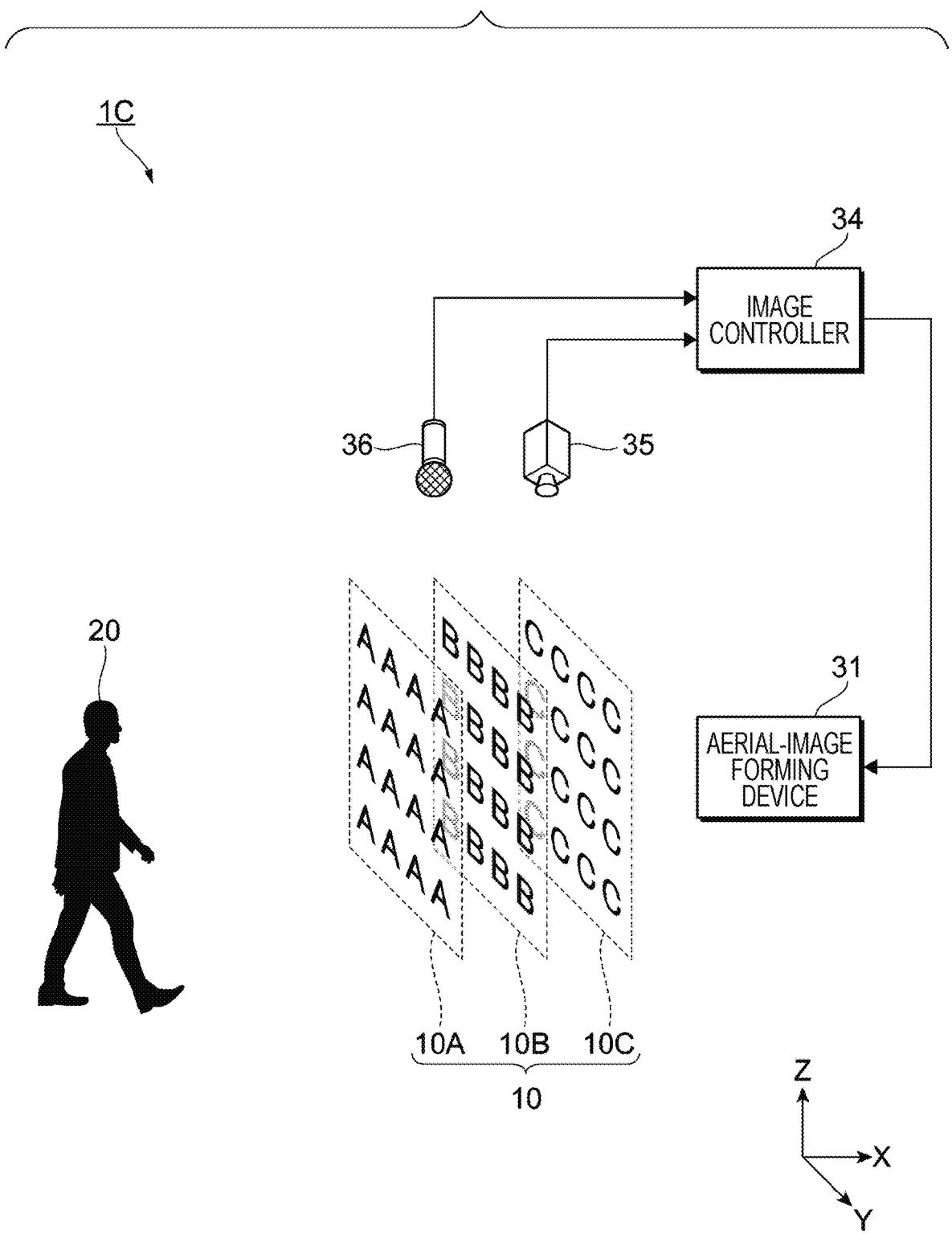
FIG. 28 schematically illustrates the configuration of an aerial-image forming system according to a third exemplary embodiment.

FIG. 28 schematically illustrates the configuration of an aerial-image forming system 1C according to a third exemplary embodiment. The aerial-image forming system 1C is an example of an information processing system.

In FIG. 28, components corresponding to those in FIG. 1 are given the corresponding reference signs.

This exemplary embodiment is different from the first exemplary embodiment in that a single aerial-image forming device 31 is used to form the three aerial images 10A, 10B, and 10C.

In this exemplary embodiment, the three aerial images 10A, 10B, and 10C may be formed in a time-sharing manner. In the case of the aerial-image forming devices 31A to 31D shown in FIGS. 3A to 6, for example, an optical element located in the optical path is moved at high speed so as to form the aerial images 10A, 10B, and 10C. In the case of the aerial-image forming device 31E shown in FIG. 7, for example, the coordinates of a light emission point in the air are switched at high speed so as to form the aerial images 10A, 10B, and 10C.

The three aerial images 10A, 10B, and 10C may be formed as three layers constituting a single three-dimensional image.

Fourth Exemplary Embodiment

Schematic Configuration of Aerial-Image Forming System

In this exemplary embodiment, a function for receiving an output of an aerial image is added to the aerial-image forming system described above.

Figure 29:
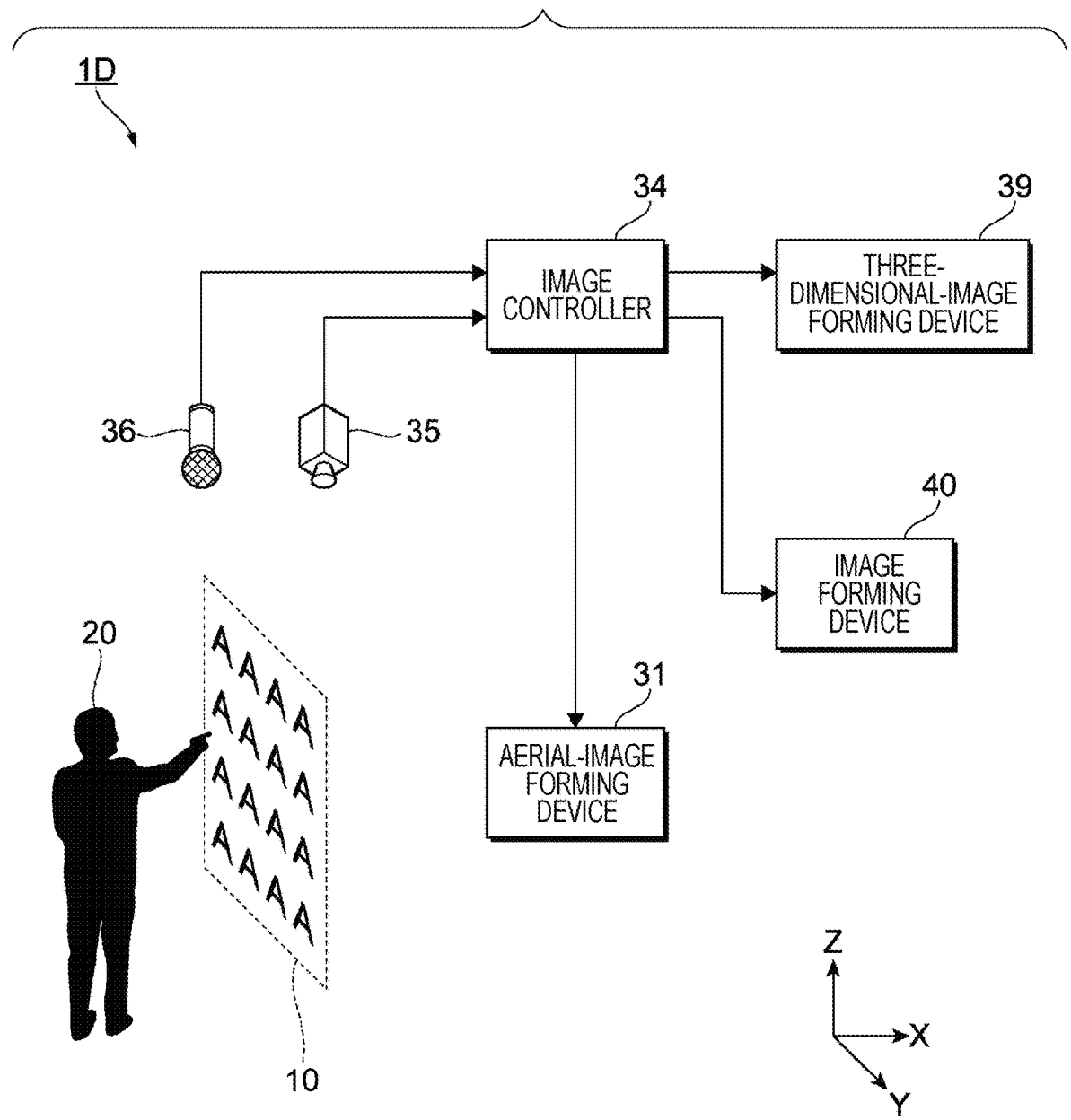
FIG. 29 schematically illustrates the configuration of an aerial-image forming system according to a fourth exemplary embodiment.

FIG. 29 schematically illustrates the configuration of an aerial-image forming system 1D according to a fourth exemplary embodiment. The aerial-image forming system 1D is an example of an information processing system.

In FIG. 29, components corresponding to those in FIG. 1 are given the corresponding reference signs.

In this exemplary embodiment, the aerial-image forming system 1D is provided with a three-dimensional-image forming device 39 that forms a three-dimensional image (three-dimensional object) and an image forming device 40 that forms an image onto a recording medium, such as paper. Although a single aerial image 10 is shown in FIG. 29, multiple aerial images 10 are also permissible, as in the first to third exemplary embodiments.

The three-dimensional-image forming device 39 forms a three-dimensional object in accordance with stereolithography in which liquid resin is caused to cure little by little by being irradiated with ultraviolet light, fused deposition modeling (FDM) in which thermally fused resin is stacked little by little, or powder fixing in which an adhesive is sprayed onto powdered resin.

The image forming device 40 is a printer that prints an image onto paper in accordance with a laser method or an inkjet method.

Figure 30:
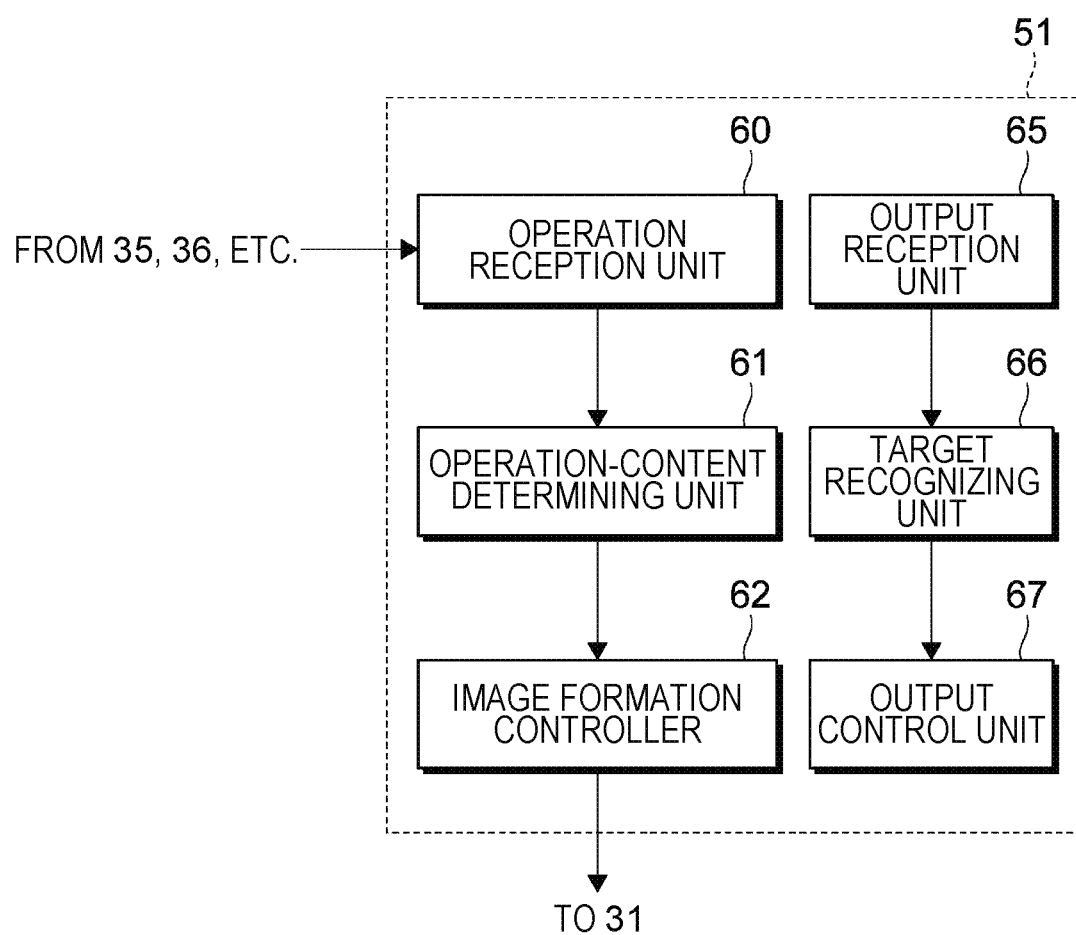
FIG. 30 illustrates an example of a functional configuration of an image controller according to the fourth exemplary embodiment.

FIG. 30 illustrates an example of a functional configuration of the image controller 34 (see FIG. 29) according to the fourth exemplary embodiment.

In FIG. 30, components corresponding to those in FIG. 9 are given the corresponding reference signs.

The functional configuration shown in FIG. 30 is realized by the CPU 51 executing a program. The image controller 34 has the hardware configuration shown in FIG. 8.

The image controller 34 according to this exemplary embodiment functions as the operation reception unit 60, the operation-content determining unit 61, the image formation controller 62, an output reception unit 65 that receives an output command with respect to an aerial image, a target recognizing unit 66 that recognizes the type of aerial image as a target of the output command, and an output control unit 67 that controls the output based on the recognition result.

Of the above functions, the functions unique to this exemplary embodiment are the output reception unit 65, the target recognizing unit 66, and the output control unit 67.

Figure 34:
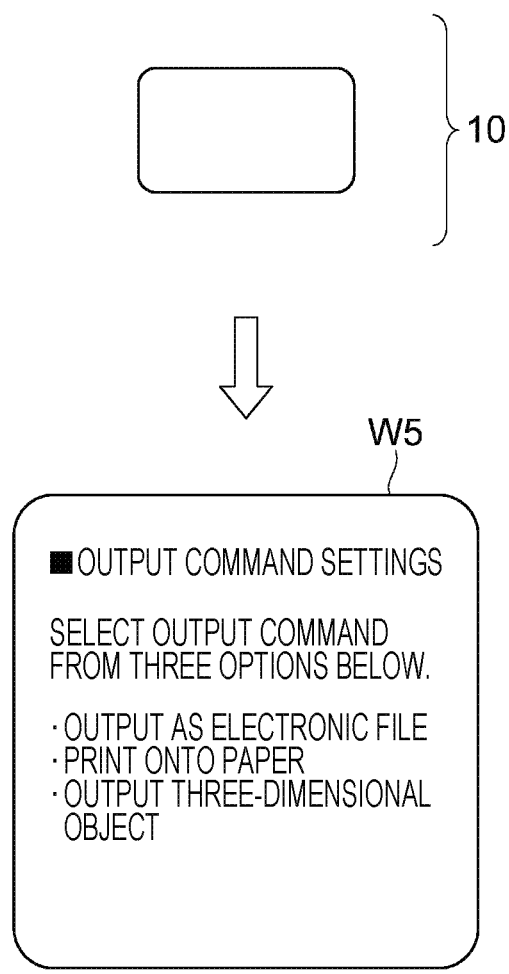
FIG. 34 illustrates an output execution example in a case where an aerial image is not recognizable as a document or a three-dimensional image.

The output reception unit 65 is a functional unit that receives a command made by the person 20 (see FIG. 29) for outputting an aerial image 10 (see FIG. 34). The reception of the output command is performed by recognizing, for example, an acquired image of a gesture of the person 20. Alternatively, the reception of the output command may be performed by detecting the visual line of the person 20, by analyzing a voice, or by receiving a signal from a device, such as a controller.

The target recognizing unit 66 is a functional unit that executes a process of recognizing the type of aerial image 10 to be output. In this exemplary embodiment, the aerial image 10 may be of one of three types, namely, a document, a three-dimensional object, and a type not belonging to any of the above (i.e., miscellaneous). An output mode is roughly determinable in accordance with the type of aerial image 10.

For example, in the case of a document defined based on two-dimensional information, there is a high probability that the document may be output as an electronic file or be printed onto paper.

For example, in the case of a three-dimensional object defined based on three-dimensional information, there is a high probability that the three-dimensional object may be formed three-dimensionally or that the outer peripheral surface thereof in a specific direction may be printed continuously onto paper.

The type recognition may be performed with focus on the mode recognized by the person 20 or the data structure used for forming the aerial image 10. In the latter case, for example, even if the format visually recognized as the aerial image 10 is two-dimensional, a three-dimensional object is recognized if the corresponding data is three-dimensional data.

Examples of three-dimensional data include data compliant with the standard triangulated language (STL) expressing a three-dimensional shape as a group of triangles, data expressing a three-dimensional shape as a group of voxels, and computer-aided design (CAD) data.

The output control unit 67 is a functional unit that determines the output format based on the recognition result and an additional command made by the person 20 and that controls the output in accordance with the determined format.

Figure 31:
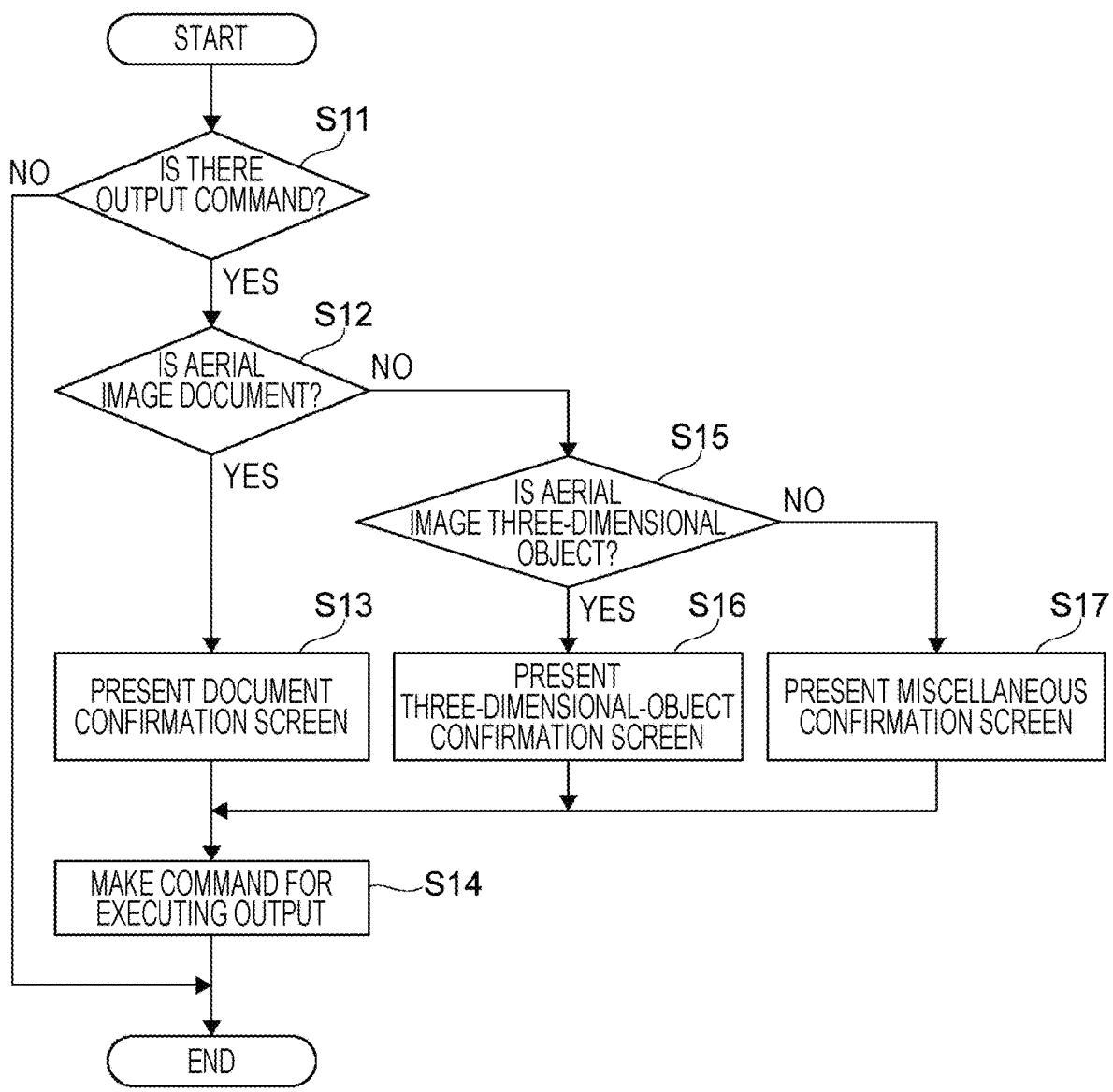
FIG. 31 is a flowchart illustrating a general outline of a process according to the fourth exemplary embodiment.

FIG. 31 is a flowchart illustrating a general outline of a process according to the fourth exemplary embodiment. Since the flowchart illustrates a general outline, the details thereof vary depending on individual usage.

In step S11, the output reception unit 65 (see FIG. 30) determines whether or not there is an output command made by the person 20.

If a negative result is obtained in step S11, the output reception unit 65 ends the process. Alternatively, the output reception unit 65 may repeat the determination until a position result is obtained.

If a positive result is obtained in step S11, the target recognizing unit 66 (see FIG. 30) determines in step S12 whether or not an aerial image is a document. The target recognizing unit 66 communicates with the aerial-image forming device 31 (see FIG. 29) so as to acquire information about data used for forming the aerial image.

For example, in a case where two-dimensional data is used for forming the aerial image, the target recognizing unit 66 recognizes that the aerial image is a document. In other words, a positive result is obtained in step S12.

If a positive result is obtained in step S12, the target recognizing unit 66 presents a document confirmation screen in step S13. Although the confirmation screen is formed as an aerial image in this exemplary embodiment, the confirmation screen may alternatively be displayed on a display unit provided in an information processing device.

FIG. 32 illustrates an output execution example in a case where the aerial image 10 is a document. In FIG. 32, multiple pages are expressed two-dimensionally.

In a case where the aerial image 10 is a document, a confirmation screen W1 presents options. Specifically, two types of selectable options, namely, an "output as electronic file" option and a "print onto paper" option, are presented. Although there are various methods for selecting an option, for example, a region where the option is displayed is designated by using a finger or hand.

If the "output as electronic file" option is selected, the target recognizing unit 66 makes a command for outputting the image as an electronic file 70. The electronic file 70 may be generated by the image controller (see FIG. 29), may be generated by the aerial-image forming device 31 (see FIG. 29), or may be generated by an information processing device (e.g., a computer) (not shown) that has transmitted the two-dimensional data to the aerial-image forming device 31.

If additional images, such as labels for the document, are addable to the aerial image 10 or if additional images are already added to the aerial image 10, an electronic file containing a group of the pages to which the additional images are added may be outputtable.

If the "print onto paper" option is selected, the target recognizing unit 66 makes a command for printing the image onto paper 71.

If the output format is set in advance, the target recognizing unit 66 may make a command for outputting the electronic file 70 or for printing the image onto the paper 71 without displaying the confirmation screen W1.

If there is no desired option on the confirmation screen W1, the target recognizing unit 66 presents other options on another confirmation screen W2. In FIG. 32, an "output three-dimensional object" option and a "print as panorama image" option are presented.

Referring back to FIG. 31, when a command is received via the confirmation screen presented in step S13, the output control unit 67 makes a command for executing the output in step S14.

If a negative result is obtained in step S12, the target recognizing unit 66 determines in step S15 whether or not the aerial image is a three-dimensional object.

If a positive result is obtained in step S15, the target recognizing unit 66 presents a three-dimensional-object confirmation screen in step S16.

Figure 33:
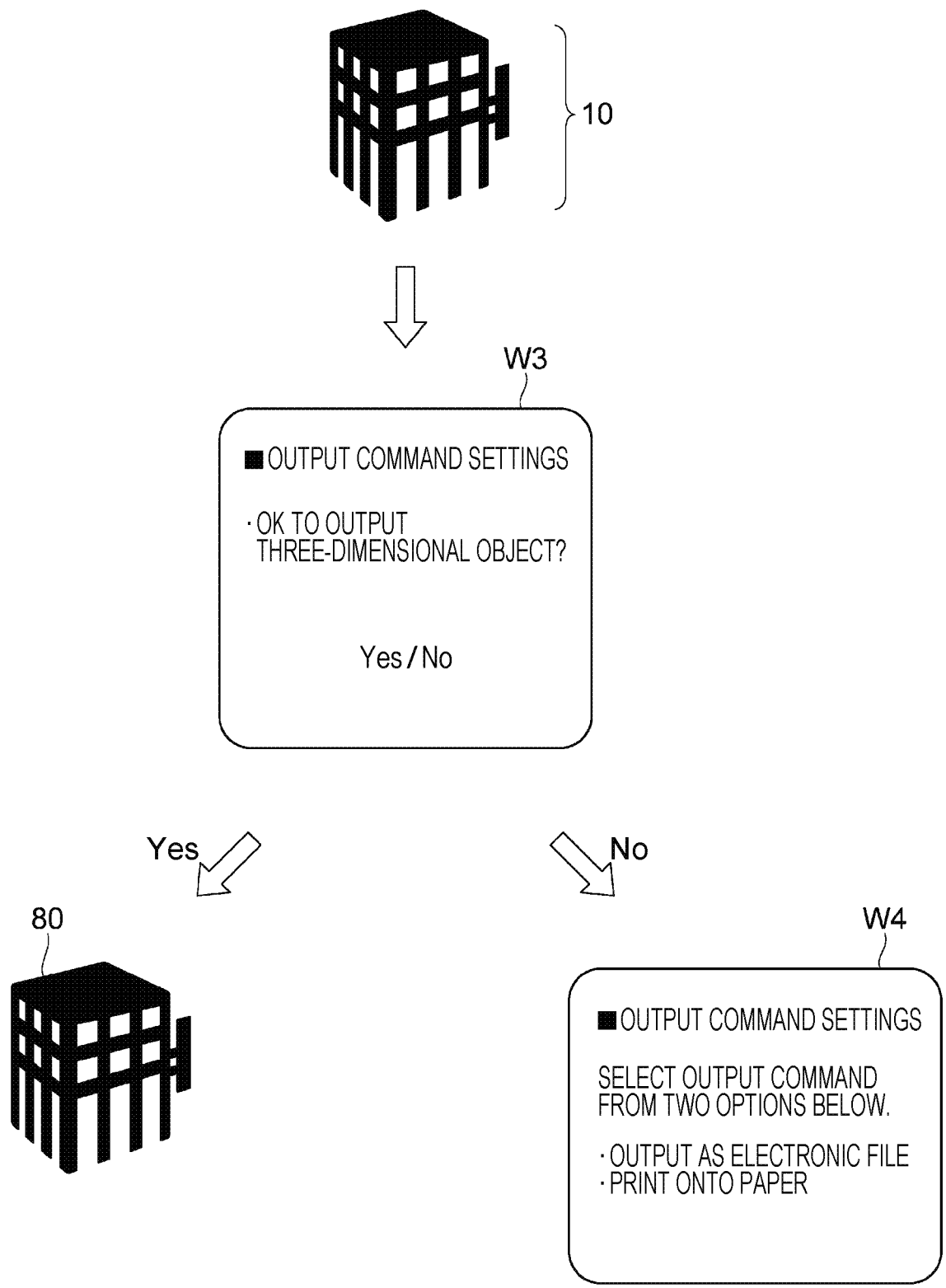
FIG. 33 illustrates an output execution example in a case where an aerial image is a three-dimensional object.

FIG. 33 illustrates an output execution example in a case where the aerial image 10 is a three-dimensional object.

If the aerial image 10 is a three-dimensional object, a message for confirming an output of the three-dimensional object is presented on a confirmation screen W3.

If YES is selected, the target recognizing unit 66 makes a command for forming a three-dimensional object 80. Specifically, the process proceeds to step S14 (see FIG. 31). In this case, the three-dimensional-image forming device 39 forms a three-dimensional object based on a corresponding method. If NO is selected, the target recognizing unit 66 presents other options on another confirmation screen W4. In FIG. 33, an "output as electronic file" option and a "print onto paper" option are presented.

Referring back to FIG. 31, when the command is received via the confirmation screen presented in step S16, the output control unit 67 makes a command for executing the output in step S14.

If a negative result is obtained in step S15, the target recognizing unit 66 presents a miscellaneous confirmation screen in step S17.

The term "miscellaneous" refers to a case where, for example, the aerial image 10 contains a mixture of two-dimensional data and three-dimensional data.

FIG. 34 illustrates an output execution example in a case where the aerial image 10 is not recognizable as a document or a three-dimensional image.

If the aerial image 10 is not recognizable as a document or a three-dimensional image, options are presented on a confirmation screen W5. Specifically, three types of selectable options, namely, an "output as electronic file" option, a "print onto paper" option, and an "output three-dimensional object" option, are presented.

Referring back to FIG. 31, when a command is received via the confirmation screen presented in step S17, the output control unit 67 makes a command for executing the output in step S14.

FIG. 35 illustrates an operational example where the aerial images 10A and 10B are printed onto paper 71.

FIG. 35 shows a print example on the paper 71 in a case where a third aerial image 10C for enhancing the visibility of the aerial images 10A and 10B is formed between the aerial image 10A and the aerial image 10B.

In FIG. 35, two types of options are shown, namely, a print option in which the aerial image 10C is not used and a print option in which the aerial image 10C is used.

In a case where the print option with no aerial image 10C is selected, images corresponding to the aerial image 10A and the aerial image 10B are printed onto two sheets of paper 71.

In a case where the print option with the aerial image 10C is selected, the aerial image 10C is printed as a margin 72 for each of the aerial image 10A and the aerial image 10B in the example in FIG. 35. By performing printing in the form of a frame, the aerial image 10A and the aerial image 10B printed within the frame become more noticeable.

Next, a specific output example will be described.

Figure 36:
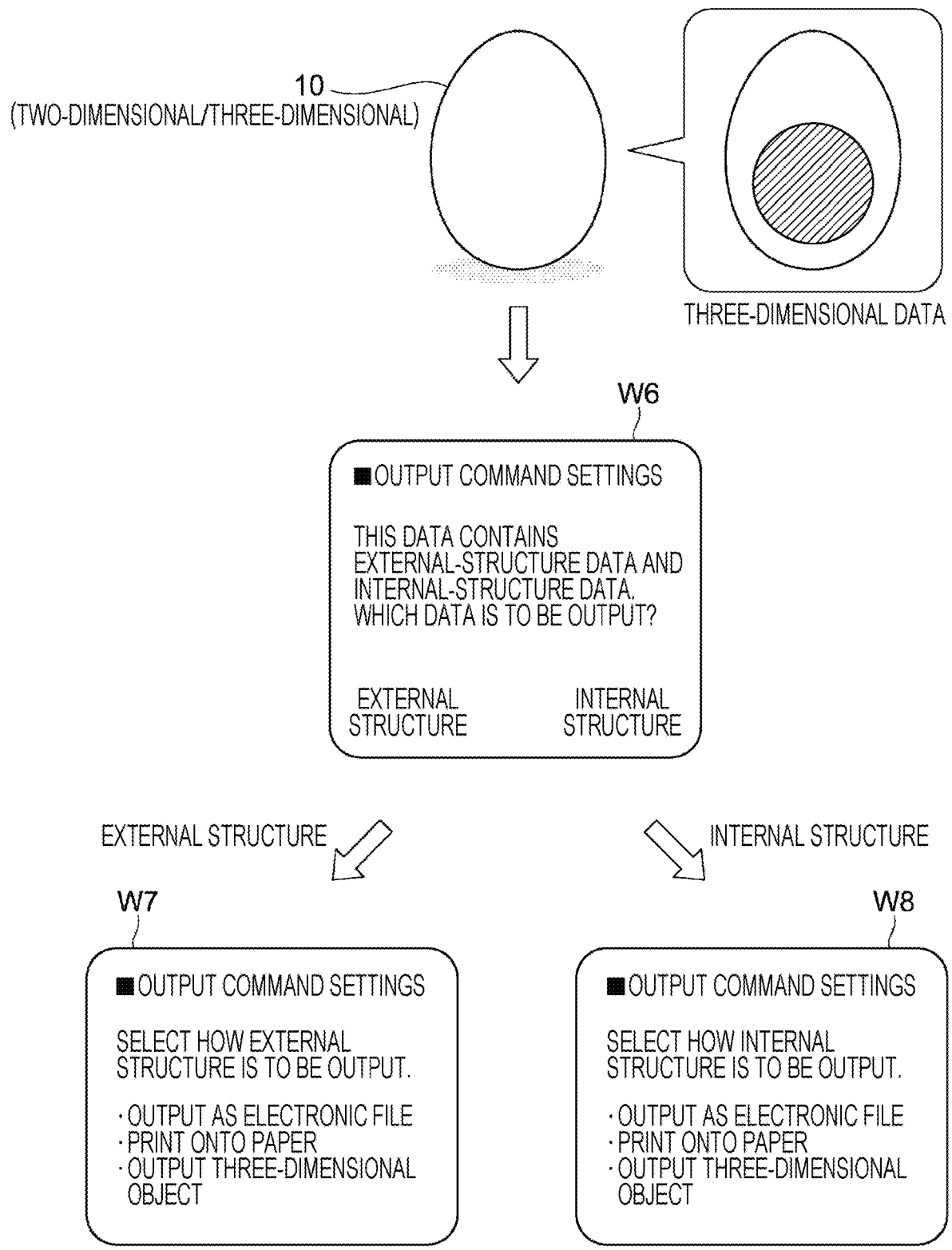
FIG. 36 illustrates an output execution example in a case where an aerial image is formed based on data that defines an internal structure.

FIG. 36 illustrates an output execution example in a case where an aerial image 10 is formed based on data that defines an internal structure.

In FIG. 36, an egg is displayed as the aerial image 10. The egg is constituted of the shell as an external structure and the white and the yolk as an internal structure.

In this exemplary embodiment, it is assumed that only the shell as the external appearance of the egg is expressed as the aerial image 10. Specifically, even if the original data has both the external structure and the internal structure, only the shell corresponding to the external structure is reproduced as the aerial image 10.

If the original data corresponding to the aerial image 10 has the external-structure data and the internal-structure data, a confirmation screen W6 with respect to an output command is presented.

On the confirmation screen W6, the external structure and the internal structure are presented as selectable options.

In a case where an output of the external structure (i.e., the shell) is selected, the target recognizing unit 66 presents an "output as electronic file" option, a "print onto paper" option, and an "output three-dimensional object" option on a confirmation screen W7.

If there is no difference in the shape of the external appearance when observed from any direction, as in an egg, it may be not necessary to select the direction from which the external structure is observed for printing. However, for example, when the "print onto paper" option is selected for printing the aerial image 10, it is desirable that the direction be selectable. Moreover, for example, if the "print onto paper" option or the "output three-dimensional object" option is selected, it is desirable that the output size be selectable. In this case, a preview image may be displayed prior to the start of the output process so that the state after the output is confirmable. The aerial image 10 may also be used for displaying the preview image.

If an output of the internal structure (i.e., the white and the yolk) is selected, the target recognizing unit 66 presents an "output as electronic file" option, a "print onto paper" option, and an "output three-dimensional object" option on a confirmation screen W8. For the selection of the internal structure, it is desirable that an "output as cross-sectional structure" option, an "output of selected part" option, or an "output of entire structure" option be selectable. It is desirable that the cross-sectional structure may be designated in accordance with, for example, which part is sectioned from which direction.

In a case where the "print onto paper" option or the "output three-dimensional object" option is selected, it is desirable that the output size be selectable. In this case, it is desirable that the state after the output be confirmable with a preview image prior to the start of the output process.

The technology according to this exemplary embodiment is summarized into a recognizing unit that recognizes the type of an aerial image formed in the air and a determining unit that determines an output mode of the aerial image in accordance with the recognized type.

The target recognizing unit 66 (see FIG. 30) described above is an example of the recognizing unit and the determining unit.

By using this technology, an output based on a format according to the type of aerial image formed in the air is readily achieved. The type of aerial image may be recognized based on a mode visually recognized in the air or based on the structure of data used for forming the aerial image.

Other Exemplary Embodiments

Although the exemplary embodiments of the present invention have been described above, the technical scope of the present invention is not limited to the scope described in the above exemplary embodiments. It is obvious from the scope of the claims that exemplary embodiments achieved by modifying or altering the above exemplary embodiments are included in the technical scope of the present invention.

Although the aerial images 10 formed are merely flat in the above exemplary embodiments, the exemplary embodiments may also be applied to a case where the aerial images 10 formed have a three-dimensional shape.

Although the first exemplary embodiment described above relates to a case where multiple aerial images 10 are formed in the depth direction, a gesture-based motion command made with respect to an aerial image 10 may be applied to a case where there is one aerial image 10 to be formed in the air.

For example, in a case where the aerial image 10C alone is formed in FIG. 16 (that is, in a case where the aerial images 10A and 10B do not exist), the aerial image 10C may be shifted toward the front side (e.g., the position of the aerial image 10A) when a gesture of moving a finger toward the front side is performed. In contrast, when a gesture of pushing a hand toward the rear side is performed, the position where the aerial image 10C is formed may be shifted further toward the rear side. In a case where the position where the aerial image 10C is formed is to be shifted in the depth direction, the size of the image may be adjusted in accordance with the shifting distance so that a change in the size of the image is not perceived.

In a case where a gesture of moving a hand leftward, rightward, upward, or downward is performed, the position where the aerial image 10C is formed may be shifted leftward, rightward, upward, or downward.

Accordingly, the positions where aerial images 10 are formed are manipulable by gesture, so that the operability with respect to the aerial images 10 may be enhanced, as compared with a case where the positions are not shiftable to begin with. Alternatively, a motion command may be made by performing a control operation using, for example, a remote controller.

In the first exemplary embodiment described above, the number of aerial images 10 formed in the air is maintained even after the positions where the aerial images 10 are formed are interchanged or shifted by gesture. Alternatively, an aerial image 10 other than the aerial image 10 specified as the shift target may be deleted from the air.

Furthermore, while the display of other aerial images 10 is maintained, the outer edge of the aerial image 10 specified as the shift target may be displayed in a blinking manner so as to clearly express that the aerial image 10 is to be shifted.

Accordingly, the visibility of the aerial image 10 specified as the shift target may be enhanced, as compared with a case where the display mode (including decoration) of the aerial image 10 is not changed before and after the shifting.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing device comprising:
    a controller configured to:
        control each of a plurality of image forming devices to display an image, each image being one of a plurality of aerial images formed as floating images in air and being arranged in overlapping layers with each other when viewed by a user in a depth direction from a front-most layer of the floating images to a back-most layer of the floating images,
        wherein each of the aerial images is formed by a separate image forming device of the plurality of image forming devices, and each aerial image is displayed in a different position in the air, in an arranged order in the depth direction; and
        in response to a command from a user, control to change, in the depth direction, the arranged order of at least one of the plurality of aerial images by interchanging image data of an aerial image that is transmitted to one of the plurality of image forming devices with image data of another aerial image that is transmitted to another of the plurality of image forming devices.

2. The information processing device according to claim 1,
    wherein the controller specifies at least one image of the plurality of aerial images as a command target by detecting overlapping between a part of an object inserted in the depth direction from a front side and the at least one image of the plurality of aerial images.

3. The information processing device according to claim 2,
    wherein the part of the object is a section smaller than a predetermined size.

4. The information processing device according to claim 2,
    wherein the at least one image of the plurality of aerial images having a smaller area formed in accordance with the overlapping with the part of the object is specified as an operation target.

5. The information processing device according to claim 1,
    wherein the controller specifies at least one image of the plurality of aerial images as a command target by detecting overlapping between an outer edge of the at least one image of the plurality of aerial images and a part of an object.

6. The information processing device according to claim 5,
wherein the controller sets the overlapping for a predetermined time period or longer as a detection target.

7. The information processing device according to claim 1,
wherein the controller specifies at least one image of the plurality of aerial images as a command target by performing image-processing on a gesture of the user.

8. The information processing device according to claim 1,
wherein the controller specifies at least one image of the plurality of aerial images as a command target by recognizing a voice of the user.

9. The information processing device according to claim 1,
wherein the controller shifts one or more of the plurality of aerial images designated by the user to a position at the front side.

10. The information processing device according to claim 1,
wherein, of the images displayed at respective positions in an arrangement direction, the controller excludes, from the display, a section that overlaps with a display of an object displayed at the respective positions at the front side.

11. The information processing device according to claim 1,
wherein, of the images displayed at respective positions in an arrangement direction, the controller decreases brightness of a section that overlaps with a display of an object displayed at the respective positions at the front side.

12. The information processing device according to claim 1,
wherein, in a case where one or more of the plurality of aerial images designated by the user are deleted, the controller adjusts a position of a remaining one or more of the plurality of aerial images in the depth direction.

13. The information processing device according to claim 1,
wherein, in a case where one or more of the images designated by the user are deleted, the controller expands a display of an object included in a remaining one or more of the plurality of aerial images.

14. The information processing device according to claim 1,
wherein, in a case where one or more of the images are inserted, the controller reduces arrangement spacing in the depth direction.

15. The information processing device according to claim 1,
wherein, in a case where one or more of the plurality of aerial images are inserted, the controller reduces a display of an object included in each image.

16. An information processing device comprising:
a controller configured to:
control each of a plurality of image forming devices to display an image, each image being displayed at a position, in a depth direction, of a plurality of aerial images formed as floating images in air, and being arranged in overlapping layers with each other when viewed by a user in a depth direction from a front-most layer of the floating images to a back-most layer of the floating images,
wherein each of the aerial images is formed by a separate image forming device of the plurality of image forming devices, and each aerial image is displayed in a different position in the air, in an arranged order in the depth direction; and
in response to a command from a user, control to change, in the depth direction, the arranged order of at least one image of the plurality of aerial images by interchanging image data of an aerial image that is transmitted to one of the plurality of image forming devices with image data of another aerial image that is transmitted to another of the plurality of image forming devices.

17. An information processing system comprising:
a plurality of image forming units, each image forming unit being configured to form an image in air; and
a controller configured to:
control each of a plurality of image forming devices to display an image, each image being one of a plurality of aerial images formed as floating images in air and being arranged in overlapping layers with each other when viewed by a user in a depth direction from a front-most layer of the floating images to a back-most layer of the floating images,
wherein each of the aerial images is formed by a separate image forming device of the plurality of image forming devices, and each aerial image is displayed in a different position in the air, in an arranged order in the depth direction; and
in response to a command from a user, control to change, in the depth direction, the arranged order of at least one image of the plurality of aerial images by interchanging image data of an aerial image that is transmitted to one of the plurality of image forming devices with image data of another aerial image that is transmitted to another of the plurality of image forming devices.

18. The information processing system according to claim 17,
wherein one image forming unit of the plurality of image forming devices forms the plurality of aerial images at different positions in a time-sharing manner.

19. A non-transitory computer readable medium storing a program causing a computer to execute a process, the process comprising:
controlling each of a plurality of image forming devices to display an image, each image being one of a plurality of aerial images formed as floating images in air and being arranged in overlapping layers with each other when viewed by a user in a depth direction from a front-most layer of the floating images to a back-most layer of the floating images;
displaying each of the aerial images in a different position in the air, in an arranged order in a depth direction, each of the aerial images being formed by a separate image forming device of a plurality of image forming devices; and
in response to a command from a user, controlling to change, in the depth direction, an arranged order of at least one image of the plurality of aerial images by interchanging image data of an aerial image that is transmitted to one of the plurality of image forming devices with image data of another aerial image that is transmitted to another of the plurality of image forming devices.

* * * * *